(12) United States Patent
Everts et al.

(10) Patent No.: US 11,881,792 B2
(45) Date of Patent: Jan. 23, 2024

(54) ELECTRICAL CONVERTER

(71) Applicant: PRODRIVE TECHNOLOGIES INNOVATION SERVICES B.V., Son en Breugel (NL)

(72) Inventors: Jordi Everts, Son (NL); Thomas Valentijn Gerrits, Son (NL)

(73) Assignee: PRODRIVE TECHNOLOGIES INNOVATION SERVICES B.V., Son en Breugel (NL)

( * ) Notice: Subject to any disclaimer, the term of this patent is extended or adjusted under 35 U.S.C. 154(b) by 277 days.

(21) Appl. No.: 17/603,238

(22) PCT Filed: Apr. 10, 2020

(86) PCT No.: PCT/EP2020/060308
§ 371 (c)(1),
(2) Date: Oct. 12, 2021

(87) PCT Pub. No.: WO2020/212278
PCT Pub. Date: Oct. 22, 2020

(65) Prior Publication Data
US 2022/0190744 A1    Jun. 16, 2022

(30) Foreign Application Priority Data

Apr. 15, 2019 (NL) .................................... 2022950

(51) Int. Cl.
*B60L 53/50* (2019.01)
*H02M 3/158* (2006.01)
(Continued)

(52) U.S. Cl.
CPC ............. *H02M 7/797* (2013.01); *B60L 53/50* (2019.02); *H02M 1/4216* (2013.01); *H02M 3/158* (2013.01); *H02M 1/0058* (2021.05)

(58) Field of Classification Search
CPC .. H02M 1/4216; H02M 3/158; H02M 3/1582; H02M 7/797; H02M 1/0058; B60L 53/50
See application file for complete search history.

(56) References Cited

U.S. PATENT DOCUMENTS 5,784,269 A * 7/1998 Jacobs .................. H02M 3/158
363/89
5,946,203 A * 8/1999 Jiang ................... H02M 1/4216
363/47

(Continued)

FOREIGN PATENT DOCUMENTS

CH         713573 A2     9/2018
WO    2018130773 A1     7/2018

OTHER PUBLICATIONS

International Search Report and Written Opinion of the International Searching Authority from the European Receiving Office in PCT/EP2020/060308 dated Jun. 10, 2020, which is an international application corresponding to this U.S. application.

*Primary Examiner* — Thai T Dinh
(74) *Attorney, Agent, or Firm* — Kolitch Romano Dascenzo Gates LLC

(57) ABSTRACT

An electrical converter for conversion between a three-phase AC signal and a DC signal may include a phase selector for connecting the three phase terminals to a first, a second, and a third intermediate node, a first buck circuit having a first switch-node terminal connected to the first DC terminal, and a second buck circuit having a second switch-node terminal connected to the second DC terminal. The first and second buck circuits convert a voltage at the first, second, and third intermediate node to a voltage between the first and second DC terminal. The first and second buck circuits are connected in series between the first and second intermediate (Continued)

node, and include at least one actively switchable device connected between the common node and the third intermediate node.

20 Claims, 21 Drawing Sheets

(51) Int. Cl.
  *H02M 7/797* (2006.01)
  *H02M 1/42* (2007.01)
  *H02M 1/00* (2006.01)

(56) References Cited

U.S. PATENT DOCUMENTS

| | | | | |
|---|---|---|---|---|
| 6,046,915 | A * | 4/2000 | Jacobs | H02M 3/158 363/39 |
| 9,444,363 | B1 * | 9/2016 | Deboy | H02M 1/08 |
| 10,917,019 | B2 * | 2/2021 | Yelaverthi | H02M 1/15 |
| 2015/0029711 | A1 | 1/2015 | Hartmann et al. | |

* cited by examiner

ELECTRICAL CONVERTER

TECHNICAL FIELD

The present disclosure relates to the field of electrical power conversion. In particular, the present disclosure relates to an electrical converter and a method for converting electrical power.

BACKGROUND ART

For example, when the battery of an electric vehicle is charged, the AC voltage from an electrical grid is converted by an electrical converter into a DC voltage which is then provided to the battery that is being charged. For example, an electrical converter may convert a three-phase AC voltage into a DC voltage between the terminals of a DC bus to which the high-voltage (e.g. 200-400 V) battery of the vehicle may be connected. Also wireless charging systems for electric cars, electric motor drives, or gradient amplifiers for Magnetic Resonance Imaging (MRI) scanners typically need such three-phase AC-to-DC conversion to create a high-voltage DC bus from which power can be drawn.

Usually the current that is drawn by the electrical converter from each phase of the three-phase grid, for example when a load draws power from the DC output of the electrical converter, needs to be substantially sinusoidal and substantially in phase with the sinusoidal voltage of that particular phase, resulting in a power factor that is substantially equal to one. Therefore, the three-phase AC-to-DC conversion advantageously requires a three-phase Power Factor Correcting (PFC) electrical AC-to-DC converter. Also low distortion, for example a low Total Harmonic Distortion (THD), of the current drawn from the grid is typically required for such PFC converters.

Conventionally, when the voltage between the DC bus terminals is lower than the full-wave rectified AC voltage, electrical converters are used that comprise a boost-type PFC stage with, e.g., a 700-900 V DC output, which is connected in series with a DC-DC buck converter to generate the desired DC bus voltage, e.g., in the range of 200-400 V. Alternatively, buck-type PFC converters based on the 3rd harmonic active filter principle have been introduced as a single-stage alternative to these conventional two stage converters, reducing the number of conversion stages in order to achieve a higher overall energy conversion efficiency and a higher power-to-volume ratio (i.e. a higher power density).

For example, reference T. Soeiro, T. Friedli, J. W. Kolar, "SWISS Rectifier—A Novel Three-Phase Buck-Type PFC Topology for Electric Vehicle Battery Charging", Proceedings of the 27th Applied Power Electronics Conference and Exposition (APEC 2012), Orlando Fla., USA, Feb. 5-9, 2012, further referred to as '[REFERENCE 1]' introduces an electrical converter that uses the 3rd harmonic active filter principle and that is adapted for single-stage buck-type three-phase PFC AC-to-DC conversion with DC-bus voltage levels that are lower than the full-wave rectified AC voltage, e.g., in the range of 200-400 V. The electrical converter comprises a phase selector for converting a three-phase AC input voltage into intermediate voltages at an upper intermediate node, a lower intermediate node and a middle intermediate node. An output stage with two DC-DC buck circuits converts the intermediate voltages into a DC output voltage. In such existing embodiments the middle intermediate node is connected to the common node of the two DC-DC buck circuits.

A disadvantage of the single-stage buck-type PFC converter based on the 3rd harmonic active filter principle as presented in FIG. 1 of [REFERENCE 1] is that in a practical realization, where a common-mode (L-C) output filter, often containing a coupled capacitive midpoint, is needed to reduce leakage currents to the load and/or to protective earth (PE), quasi lossless zero-voltage-switching (ZVS) of the semiconductor switches cannot be achieved without increasing the cost, size, and complexity of the inductors of the two DC-DC buck circuits (e.g. due to the need for magnetic coupling of these inductors). This is particularly the case when several parallel output stages are used in order to increase the power rating of the converter, and especially when these paralleled output stages are operated in an interleaved fashion in order to decrease the size of the in- and output filters of the PFC converter.

SUMMARY

It is an objective of embodiments of the present disclosure to provide an improved electrical converter and method for conversion between a three-phase AC signal and a DC signal, and in particular for converting a three-phase AC input into a DC output and/or for converting a DC input into a three-phase AC output, and more in particular a low cost electrical converter for three-phase buck-type PFC AC-to-DC conversion. Preferably, embodiments of the electrical converter have one or more of the following advantages: the converter provides the possibility to operate the switching devices under zero-voltage-switching (ZVS) conditions in order to reduce switching losses and increase the efficiency and power density of the converter, even when a common-mode (L-C) output filter with coupled capacitive midpoint is present and/or when interleaving of several parallel output stages is used in order to increase the power rating of the converter and/or decrease the size of the in- and output filters; the converter is simple to design; it is simple to extend the hardware design to an arbitrary number of interleaved stages; the converter has a high power-to-volume ratio (power density) which is enabled by little magnetic energy storage in the electrical converter; the converter generates low current distortions at the three phase terminals; the converter is able to draw substantially sinusoidal currents at the three phase terminals, at a power factor that is substantially equal to one.

According to a first aspect of the present disclosure, there is therefore provided an electrical converter comprising three phase terminals, a first DC terminal and a second DC terminal, a phase selector, a first buck circuit and a second buck circuit. The phase selector is configured for connecting the three phase terminals to a first intermediate node, a second intermediate node and a third intermediate node of the electrical converter. The first buck circuit comprises a first switch-node terminal that is operably connected to the first DC terminal and a second buck circuit comprising a second switch-node terminal that is operably connected to the second DC terminal. The first and the second buck circuits are connected for converting a voltage at the first intermediate node, the second intermediate node and the third intermediate node to a voltage between the first and second DC terminal. The first and the second buck circuits are connected in series between the first intermediate node and the second intermediate node such that there is a common node of the first and second buck circuit. The first and second buck circuit comprise at least one actively switchable device connected between the common node and the third intermediate node.

Electrical converters feature a phase selector for converting a three-phase AC signal with three AC voltages provided at the three phase terminals of the electrical converter into an intermediate signal with three DC voltages provided between the first intermediate node, typically an upper intermediate node, the second intermediate node, typically a lower intermediate node, and the third intermediate node, typically a middle intermediate node, when the conversion is from AC to DC, or vice versa when the conversion if from DC to AC. The electrical converter further comprises a power stage comprising the first and second buck circuit. By having the first and second buck circuit connected in series with at least one actively switchable device connected between the common node and the third intermediate node, as defined above, it becomes possible to have a third intermediate node, typically a middle intermediate node, which is not directly connected to the common node of the first and second buck circuit.

Compared to the prior art, the at least one actively switchable device connected between the common node and the third intermediate node provides additional controllability and flexibility for tailoring and optimizing the shape of the currents flowing in the inductors of the series-connected first and second buck circuit such that, for example, zero-voltage-switching (ZVS) of the semiconductor switches of the buck circuits can be achieved in the whole operating range of the converter, i.e., without increasing the cost, size, and complexity of the mentioned inductors (e.g. due to the need for magnetic coupling of these inductors in prior art solutions), even when a common-mode (L-C) output filter with coupled capacitive midpoint is present and/or when interleaving of several parallel output stages is used in order to increase the power rating of the converter and/or decrease the size of the in- and output filters. The ability of the converter to operate under zero-voltage-switching conditions within its whole operating range leads to an increased conversion efficiency and/or reduced system size. The latter is the result of a higher switching frequency that can be used, leading to a reduced size of the passive filter elements (inductors and capacitors), without increasing the semiconductor switching losses.

According to an aspect, the first buck circuit is configured for allowing connecting the first switch-node terminal to any one of the first intermediate node, the third intermediate node, and the common node; and the second buck circuit is configured for allowing connecting the second switch-node terminal to any one of the second intermediate node, the third intermediate node, and the common node. This may be achieved using suitable control signals, typically pulse width modulation signals, for controlling the actively switchable devices of the first and second buck circuit. In other words, depending on the control signals, the first switch-node terminal will either be connected to the first intermediate node, or the third intermediate node, or the common node; and the second switch-node terminal will either be connected to the second intermediate node, or the third intermediate node, or the common node.

In an exemplary embodiment, the electrical converter may be configured for AC-to-DC conversion, and the three-phase AC signal may be a three-phase AC input voltage and the DC signal may be a DC output voltage having a voltage level that is lower than the full-wave rectified AC input voltage, e.g., in the range of 200-400 V.

Preferably, the first buck circuit comprises a first device connected for interrupting a current flow between the first switch-node terminal and the third intermediate node, a second device connected for interrupting a current flow between the first switch-node terminal and the first intermediate node, and a third device connected for interrupting a current flow between the first switch-node terminal and the common node, wherein at least two of said first, second and third devices of the first buck circuit are actively switchable. Also, preferably, the second buck circuit comprises a fourth device connected for interrupting a current flow between the second switch-node terminal and the third intermediate node, a fifth device connected for interrupting a current flow between the second switch-node terminal and the second intermediate node, and a sixth device connected for interrupting a current flow between the second switch-node terminal and the common node, wherein at least two of said fourth, fifth and sixth devices of the second buck circuit are actively switchable.

More preferably, the first and fourth devices are actively switchable, and the above mentioned at least one actively switchable device connected between the common node and the third intermediate node comprises the first and the fourth devices. When the converter is used to convert a three-phase AC input into a DC output, preferably, at least the second and fifth devices are actively switchable. When the converter is used to convert a DC input into a three-phase AC output, preferably, at least the third and sixth devices are actively switchable. In that case, the above mentioned at least one actively switchable device connected between the common node and the third intermediate node comprises the third and the sixth devices. When it is desirable to do conversion in two directions, preferably the first, second, third, fourth, fifth and sixth devices are actively switchable, and the devices of the phase selector are also actively switchable, see further. In that case, the above mentioned at least one actively switchable device connected between the common node and the third intermediate node comprises the first, third, fourth and the sixth devices. Further, by using devices that are actively switchable, a quasi-lossless zero-voltage switching is possible. This allows for power conversion at lower switching losses, and thus higher energy efficiency. Also, higher switching frequencies may be used in order to increase the power density (reduced size) and reduce the cost of the electrical converter.

Preferably, the phase selector comprises devices, typically semiconductor devices, which are actively switchable for selectively connecting the third intermediate node to the three phase terminals. More in particular, the phase selector may be configured to connect the first intermediate node with the phase terminal having the highest voltage of the three-phase AC voltage, the second intermediate node with the phase terminal having the lowest voltage of the three-phase AC voltage, and the third intermediate node with the phase terminal having a voltage between said highest voltage and said lowest voltage.

According to an exemplary embodiment, the electrical converter comprises a controller configured to control at least one of the phase selector and the first and second buck converter. Preferably, the phase selector and the controller are configured such that switching of the devices of the phase selector is controlled according to a switching pattern in which: the phase terminal having a highest voltage is connected to the first intermediate node, the phase terminal having a lowest voltage is connected to the second intermediate node, and the phase terminal having an intermediate voltage between the highest voltage and the lowest voltage is connected to the third intermediate node. Preferably, the controller is configured to control the first buck circuit and the second buck circuit, such that a desired DC output is obtained between the first and the second DC terminal. More in particular, the controller may be configured to control a duty cycle and/or a switching frequency and/or a conduction sequence of control signals used to control the first buck circuit and the second buck circuit. The switching frequency is typically at least 10 times higher than the frequency of the three-phase AC signal. Preferably, the controller is configured to vary the duty cycle of a control signal for controlling the first actively switchable device substantially synchronously with the voltage of the third intermediate node, when the voltage between the third intermediate node and the midpoint of the three-phase AC voltage is positive, and to vary the duty cycle of a control signal for controlling the fourth actively switchable device substantially synchronously with the voltage of the third intermediate node, when the voltage between the third intermediate node and the midpoint of the three-phase AC voltage is negative; and/or to vary, e.g. increase or decrease, the duty cycle of a control signal for controlling the second and fifth actively switchable device substantially synchronously with the voltage of the first and second intermediate node, respectively.

The switchable devices mentioned above are preferably semiconductor devices. It is noted that the term "semiconductor device" may refer to a single semiconductor component or to multiple semiconductor components connected in (anti-)parallel and/or in (anti-)series. For example, a semiconductor device which is actively switchable may comprise a transistor connected in anti-parallel with a diode.

In a preferred embodiment, the first and second buck circuit further comprises a first filter inductor connected between the first switch-node terminal and the first DC terminal and a second filter inductor connected between the second switch-node terminal and the second DC terminal, respectively. Further, at least one filter capacitor may be provided, preferably a series connection of at least two filter capacitors, connected between the first and second DC terminals. The first and second filter inductor and/or the one or more filter capacitors may form a filter with a midpoint. In that case, the common node may be connected to the midpoint.

In a preferred embodiment, the electrical converter comprises a filter comprising capacitors which interconnect the intermediate first, second and third nodes, preferably in the form of a star or delta connection. When the capacitors are interconnected in a star connection, the common node may be connected to a star point of the star connection. In addition or alternatively, a filter comprising capacitors which interconnect the phase terminals may be provided, preferably in the form of a star or delta connection.

In a preferred embodiment, the electrical converter comprises measurement means for measuring at least one of the DC signal, an electrical signal influencing the DC signal, an electrical signal influenced by the DC signal. The electrical signal may be a current or a voltage. The controller comprises a control loop configured to adapt at least one of a duty cycle, a switching frequency, and a conduction sequence of control signals for controlling at least one of the first and second buck circuit based on the measurements performed by the measurement means. Typically, the controller comprises a control loop configured to adapt at least one pulse width modulation control signal for controlling at least one of the first and second buck circuit based on the measurements performed by the measurement means. Preferably, the measurement means comprises one or more of the following: a current measurement means for measuring at least one of a current between the first switch-node terminal and the first DC terminal and a current between the second switch-node terminal and the second DC terminal, a voltage measurement means for measuring voltages at the three phase terminals, a voltage measurement means for measuring a voltage between the second and first DC terminal, a current measurement means for measuring a current between the phase selector and one or each of the first, the third and the second intermediate node, a voltage measurement means for measuring a voltage of the common node. Preferably, the control loop is configured to adapt a first pulse width modulation control signal for controlling the first buck circuit and a second pulse width modulation control signal for controlling the second buck circuit. In an advantageous embodiment the controller may be configured to interleave the first and second pulse width modulation control signals.

According to a preferred embodiment, the phase selector comprises three selector legs for connecting one of the three phase terminals to the first intermediate node, the second intermediate node and the third intermediate node, wherein each of the three selector legs comprises a half bridge comprising semiconductor switches. The phase selector may comprise a half-bridge configuration with diodes, typically six diodes. Optionally, the diodes may be replaced with controllable semiconductor devices having bidirectional current flow capabilities. This will allow using the electrical converter both for converting a three-phase AC input into a DC output and for converting a DC output into a three-phase AC input. In other words, such embodiments allow for a bidirectional power flow through the converter.

According to a preferred embodiment, the first and second buck circuits may be scaled, e.g. when more power is needed. This can be easily done by providing a number of first buck circuit legs or a number of first buck circuits connected in parallel, and by providing a number of second buck circuit legs or a number of second buck circuits connected in parallel. When multiple first buck circuits are connected in parallel, such first buck circuits may be controlled in an interleaved way. The same applies for multiple second buck circuits connected in parallel.

According to a further aspect of the present disclosure, there is provided a battery charging system, in particular for charging a battery of an electric vehicle, comprising a power supply unit, the power supply unit comprising an electrical converter according to any one of the embodiments described above.

According to a further aspect of the present disclosure, there is provided a wireless charging system, in particular for charging a battery of an electric vehicle, comprising a power supply unit, the power supply unit comprising an electrical converter according to any one of the embodiments described above.

According to a further aspect of the present disclosure, there is provided an electric motor drive system, comprising a power supply unit, the power supply unit comprising an electrical converter according to any one of the embodiments described above.

According to a further aspect of the present disclosure, there is provided a gradient amplifier comprising an electrical converter according to any one of the embodiments described above. Also, there is provided a magnetic resonance imaging apparatus comprising the gradient amplifier.

According to yet another aspect, there is provided a method of converting between a three phase AC signal and a DC signal. The method comprises the following steps: a step of converting between the three phase AC signal and an intermediate signal, wherein the intermediate signal is applied between a first intermediate node, a second intermediate node and a third intermediate node, wherein a voltage of the three phase AC signal is applied selectively to the first intermediate node, the second intermediate node and the third intermediate node; a step of converting between the intermediate signal and the DC signal using a first and a second buck circuit, wherein the first and the second buck circuits are connected in series between the first intermediate node and the second intermediate node such that there is a common node of the first and second buck circuit, wherein said converting comprises connecting the third intermediate node to a first switch-node terminal of the first buck circuit during a first time interval and to a second switch-node terminal of the second buck circuit during a second time interval, using at least one actively switchable device between the common node and the third intermediate node. Preferably, the at least one actively switchable device of the first and second buck circuit between the common node and the third intermediate node is controlled using at least one pulse width modulation signal during said first and second time interval.

According to an aspect, the converting between the intermediate signals and the DC signal using a first and a second buck circuit comprises connecting the first switch-node terminal to any one of the first intermediate node, the third intermediate node, and the common node; and connecting the second switch-node terminal to any one of the second intermediate node, the third intermediate node, and the common node. Preferably, the first buck circuit may be controlled for connecting the first switch-node terminal alternately to the first intermediate node, the third intermediate node, and the common node, during the first time interval, and for connecting the first switch-node terminal alternately to the first intermediate node and the common node, during the second time interval; and the second buck circuit may be controlled for connecting the second switch-node terminal alternately to the second intermediate node, the third intermediate node, and the common node, during the second time interval, and for connecting the second switch-node terminal alternately to the second intermediate node and the common node during the first time interval.

According to a preferred embodiment, a voltage of the three phase AC signal having a highest voltage is applied to the first intermediate node, a voltage of the three phase AC signal having a lowest voltage is applied to the second intermediate node, and a voltage of the three phase AC signal having an intermediate voltage between the highest voltage and the lowest voltage is applied to the third intermediate node.

According to a preferred embodiment, the converting between the intermediate signal and the DC signal using a first and a second buck circuit comprises: actively controlling a first switchable device connected between the third intermediate node and the first switch-node terminal and a fourth switchable device between the third intermediate node and the second switch-node terminal; actively controlling at least one of a second switchable device connected between the first intermediate node and the first switch-node terminal and a third switchable device connected between the common node and the first switch-node terminal; actively controlling at least one of a fifth switchable divide between the second intermediate node and the second switch-node terminal and a sixth switchable device between the common node and the second switch-node terminal.

Preferably, the converting between the intermediate signals and the DC signal using a first and a second buck circuit comprises controlling at least one of a duty cycle, a switching frequency, a conduction sequence of control signals to control the first and second buck circuit. More preferably, the first switchable device is controlled with a pulse width modulation signal having a duty cycle which varies substantially synchronously with a voltage of the third intermediate node, during the first time interval, and the fourth switchable device is controlled with a pulse width modulation signal having a duty cycle which varies substantially synchronously with the voltage of the third intermediate node, during the second time interval; and/or the second and fifth switchable device are controlled with a pulse width modulation signal having a duty cycle which varies substantially synchronously with a voltage of the first and second intermediate node, respectively.

Preferably, the converting between the intermediate signals and the DC signal using a first and a second buck circuit comprises using a first filter inductor connected between the first switch-node terminal and a first DC terminal and a second filter inductor connected between the second switch-node terminal and a second DC terminal, respectively; and/or using at least one filter capacitor, preferably a series connection of at least two filter capacitors, connected between the first and second DC terminals.

Preferably, the converting between the intermediate signals and the DC signal is controlled by measuring at least one of the DC signal, an electrical signal influencing the DC signal, an electrical signal influenced by the DC signal, and by adapting at least one pulse width modulation control signal for controlling the first and/or second buck circuit based on the measured signals. The measuring may comprise measuring one or more of the following: a current between the first switch-node terminal and a first DC terminal and/or between the second switch-node terminal and a second DC terminal (N), the three phase AC signal, a voltage between a first and second DC terminal, a current between one or each of the first, the third and the second intermediate node and the common node. The adapting may comprise adapting a first pulse width modulation control signal for controlling the first buck circuit and a second pulse width modulation control signal for controlling the second buck circuit, and optionally interleaving the first and second pulse width modulation control signals.

Preferred features and technical advantages of the embodiments of the electrical converter apply mutatis mutandis for the embodiments of the method.

BRIEF DESCRIPTION OF THE DRAWINGS

The accompanying drawings are used to illustrate presently preferred non-limiting exemplary embodiments of devices of the present disclosure. The above and other advantages of the features and objects of the present disclosure will become more apparent and the present disclosure will be better understood from the following detailed description when read in conjunction with the accompanying drawings, in which.

DETAILED DESCRIPTION

Figure 1:
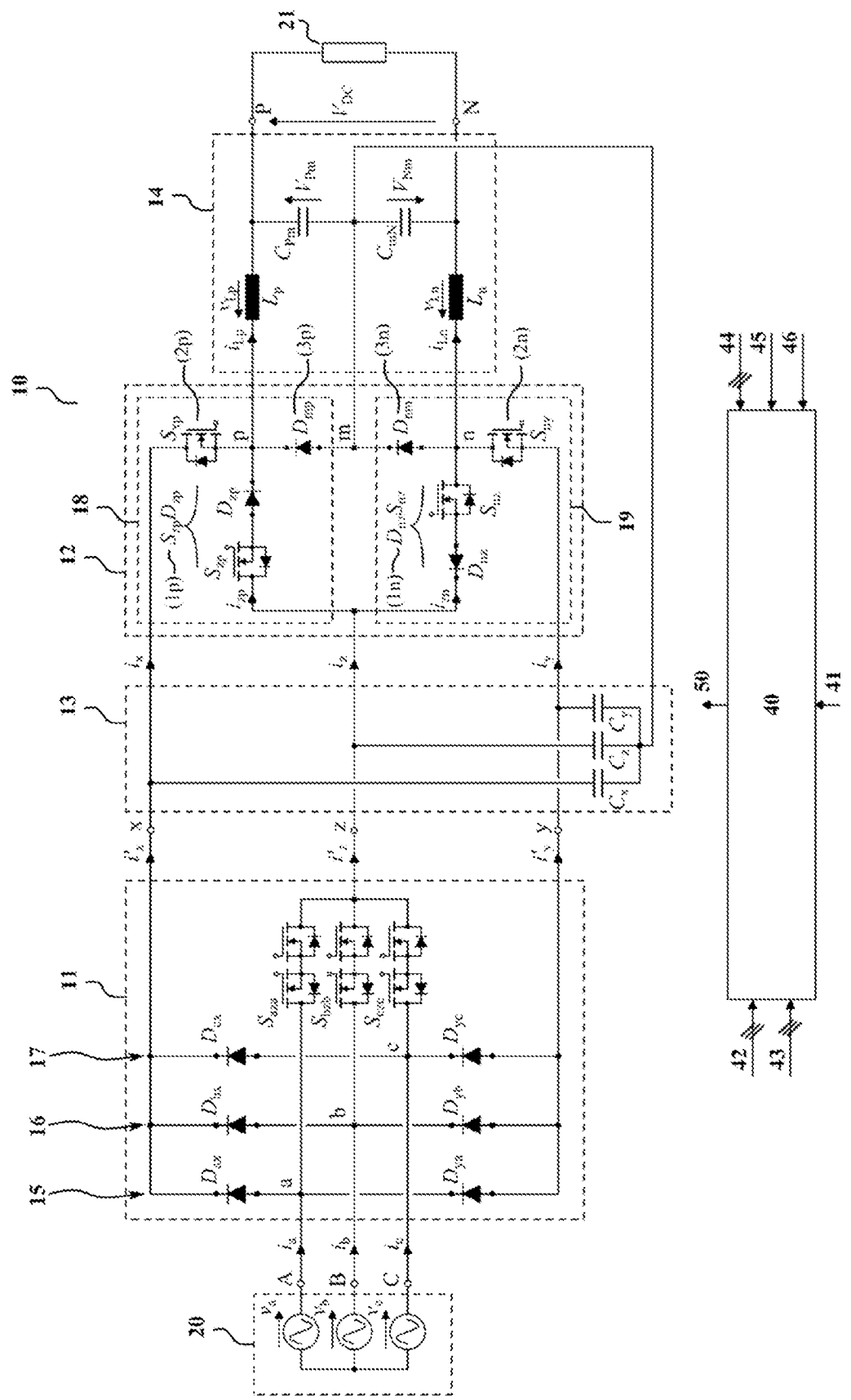
FIG. 1 is a circuit diagram of an exemplary embodiment of an electrical converter.

FIG. 1 shows an electrical converter 10, referred to as the 'PRODRIVE-SELECT RECTIFIER', comprising two power stages 11, 12 in the form of a three-phase active phase selector 11 and an output power stage 12. Electrical converter 10 further comprises an input filter 13 placed between the phase selector 11 and the output power stage 12, and an output filter 14. Alternatively or additionally, an input filter (not shown) may be arranged upstream of the phase selector.

The electrical converter 10 is an AC-to-DC converter that has three phase terminals A, B, C which are connected to a three-phase voltage of a three-phase AC grid 20, and a first and second output DC terminal P, N, here an upper output terminal P and a lower output terminal N, which for example may be connected to a DC load 21 such as, for example, a high voltage (e.g. 200-400 V) battery of an electric car. The phase selector 11 comprises three phase connections a, b, c that are connected to the three phase inputs A, B, C, and three outputs x, y, z. These outputs may be seen as a first intermediate node x, here an upper intermediate voltage node x, a second intermediate node y, here a lower intermediate voltage node y, and a third intermediate node z, here a middle intermediate voltage node z.

The phase selector 11 comprises, or consists of, three bridge legs 15, 16, 17 which each comprise two passive semiconductor devices (diodes $D_{ax}$ and $D_{ya}$ for leg 15, $D_{bx}$ and $D_{yb}$ for leg 16, $D_{cx}$ and $D_y$ for leg 17) connected in the form of a half bridge configuration, and three actively switchable semiconductor devices, here called selector switches $S_{aza}$, $S_{bzb}$, and $S_{czc}$. In the illustrated embodiment each selector switch comprises two anti-series connected actively switchable semiconductor components. Advantageously, each such switchable semiconductor component includes or is complemented by an anti-parallel diode. In this example, Metal Oxide Field Effect Transistors (MOSFETs) are used for the actively switchable semiconductor components, each including an internal anti-parallel body diode. In other embodiments an external anti-parallel diode may be provided.

The output power stage 12 comprises, or consists of, two stacked (i.e. series connected) buck bridge legs 18, 19 of first and second stacked buck circuits. The first upper buck bridge leg 18 comprises a first semiconductor device 1p, a second semiconductor device 2p and a third semiconductor device 3p. The second lower buck bridge leg 19 comprises a fourth semiconductor device ln, a fifth semiconductor device 2n and a sixth semiconductor device 3n. The second and fifth semiconductor device 2p, 2n is a buck switch ($S_{xp}$ for the upper buck bridge leg 18 and $S_{ny}$ for the lower buck bridge leg 19). The switches $S_{xp}$ and $S_{ny}$ of the buck bridge legs 18, 19 are actively switchable semiconductor devices, for example MOSFETs. The third and sixth semiconductor device 3p, 3n is a buck diode ($D_{xp}$ for the upper buck bridge leg 18 and $D_{nm}$ for the lower buck bridge leg 19). The second and third semiconductor devices 2p, 3p and the fifth and sixth semiconductor devices 2n, 3n are connected in a half-bridge configuration. The switched middle node of the upper buck bridge leg 18 forms an upper switch-node terminal p which is connected to output P via a first buck inductor, here an upper buck inductor $L_p$, and the switched middle node of the lower buck bridge leg 19 forms a lower switch-node terminal n which is connected to output N via a second buck inductor, here a lower buck inductor $L_n$.

The common node m of both, stacked, buck bridge legs 18, 19 is connected to the midpoint of the output filter 14 which comprises two output filter capacitors $C_{Pm}$, $C_{mN}$ that are connected in series between the upper output terminal P and the lower output terminal N.

The first and fourth semiconductor device 1p, ln of the first and second buck bridge leg 18, 19 is an interconnection switch $S_{zp}D_{zp}$ and $D_{nz}S_{nz}$, with bi-directional voltage blocking capability, that allows for connecting the switched middle node of the respective bridge, i.e., the upper switch-node terminal p for the upper buck bridge leg 18 and the lower switch-node terminal n for the lower buck bridge leg 19, with the middle intermediate voltage node z. The interconnection switch $S_{zp}D_{zp}$ of the upper buck bridge leg 18 comprises an actively switchable semiconductor component $S_{zp}$, e.g. a MOSFET, connected in anti-series with a diode $D_{zp}$, creating a voltage bi-directional interconnection switch. The interconnection switch D,S, of the lower buck bridge leg 19 comprises an actively switchable semiconductor component $D_{zp}$, e.g. a MOSFET, connected in anti-series with a diode $D_{nz}$, creating a voltage bi-directional interconnection switch.

The upper buck bridge leg 18 is connected between the upper intermediate voltage node x and the common node m, and is arranged in a way that current can flow from the upper intermediate voltage node x to the upper output terminal P via the switch $S_{xp}$ when the switch $S_{xp}$ is closed (conducting, on state), current can flow from the middle intermediate voltage node z to the upper output terminal P via interconnection switch $S_{zp}D_{zp}$ when the switch $S_{zp}$ is closed (conducting, on state) and the switch $S_{xp}$ is open (not conducting, off state), and current can flow from the common node m to the upper output terminal P via the diode $D_{mp}$ when the switches $S_{xp}$ and $S_{zp}$ are open (not conducting, off state).

The lower buck bridge leg 19 is connected between the common node m and the lower intermediate voltage node y, and is arranged in a way that current can flow from the lower output terminal N to the lower intermediate voltage node y via the switch $S_{ny}$ when the switch $S_{ny}$ is closed (conducting, on state), current can flow from the lower output terminal N to the middle intermediate voltage node z via interconnection switch $D_{nz}S_z$ when the switch $S_{nz}$ is closed (conducting, on state) and the switch $S_{ny}$ is open (not conducting, off state), and current can flow from the lower output terminal N to the common node m via the diode $D_{nm}$ when the switches $S_{ny}$ and $S_{nz}$ are open (not conducting, off state).

Advantageously, three high-frequency (HF) filter capacitors $C_x$, $C_y$, $C_z$, which are part of the input filter 13, are interconnecting the intermediate voltage nodes x, y, z in the form of a star-connection. Generally, it is advantageous that the three capacitors $C_x$, $C_y$, $C_z$ have substantially equal value in order to symmetrically load the AC grid. Advantageously, the star point of the three high-frequency (HF) filter capacitors $C_x$, $C_y$, $C_z$ is connected to the common node m of both buck bridge legs 18, 19, and to the midpoint of the output filter 14.

The bridge leg of the phase selector 11 that is connected with the phase input terminal A, B, or C that has the highest voltage of the three-phase AC input voltage is switched in a way that the corresponding phase input terminal A, B, or C is connected to the upper intermediate voltage node x. To achieve this, the bridge leg connects the corresponding phase connection a, b, or c with the node x via the upper diode $D_{ax}$, $D_{bx}$, $D_{cx}$ of the bridge leg, while the corresponding selector switch $S_{aza}$, $S_{bzb}$, $S_{czc}$ of the bridge leg is open (not conducting, off state). The bridge leg of the phase selector 11 that is connected with the phase input terminal A, B, or C that has the lowest voltage of the three-phase AC input voltage is switched in a way that the corresponding phase input terminal A, B, or C is connected to the lower intermediate voltage node y. To achieve this, the bridge leg connects the corresponding phase connection a, b, or c with the node y via the lower diode $D_{ya}$, $D_{yb}$, $D_{yc}$ of the bridge leg, while the corresponding selector switch $S_{aza}$, $S_{bzb}$, $S_{czc}$ of the bridge leg is open (not conducting, off state). The bridge leg of the phase selector 11 that is connected with the phase input terminal A, B, or C that has a voltage between the highest voltage and the lowest voltage of the three-phase AC input voltage is switched in a way that the corresponding phase input terminal A, B, or C is connected to the middle intermediate voltage node z. To achieve this, the bridge leg connects the corresponding phase connection a, b, or c with the node z via the selector switch $S_{aza}$, $S_{bzb}$, $S_{czc}$ which is closed (conducting, on state).

Figure 2A:
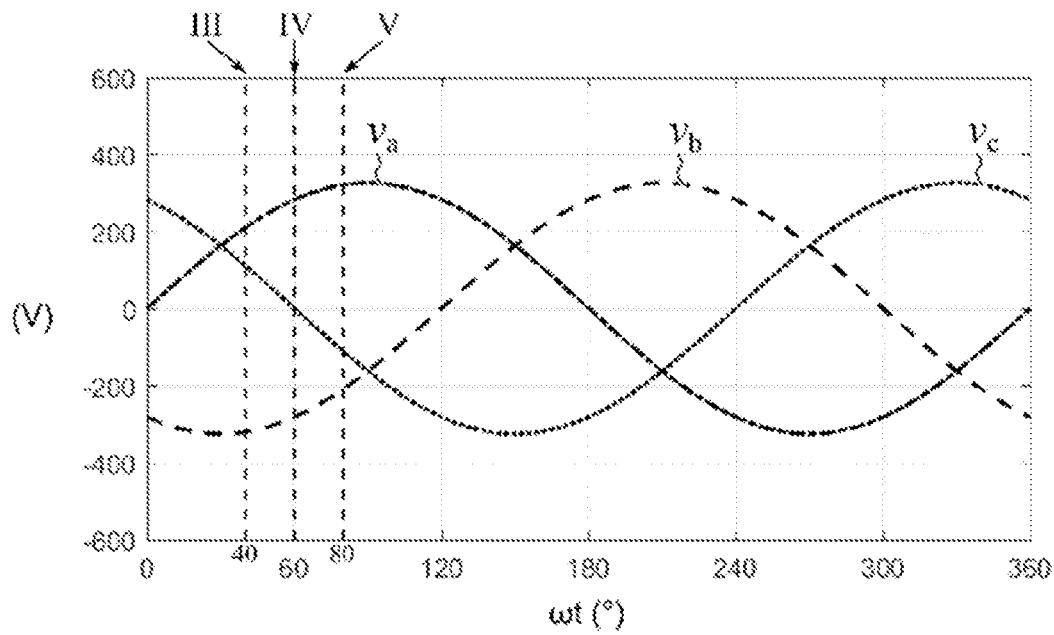
FIGS. 2A-2K illustrate various charts plotting various voltages, currents and control signals in function of $\Omega t$ (°) for the exemplary embodiment of FIG. 1.
Figure 2B:
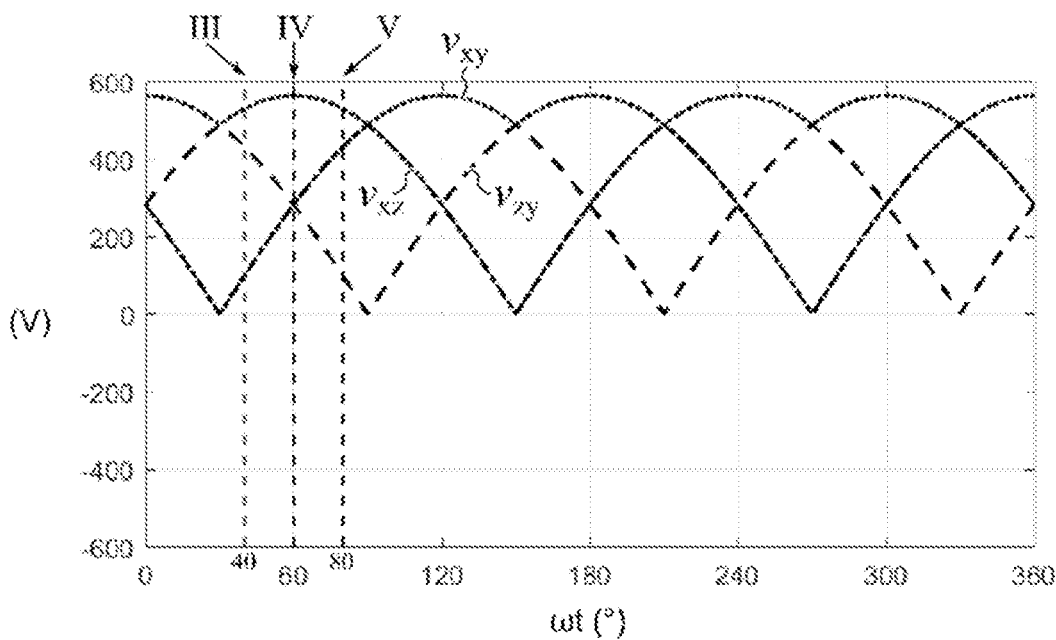
Figure 2C:
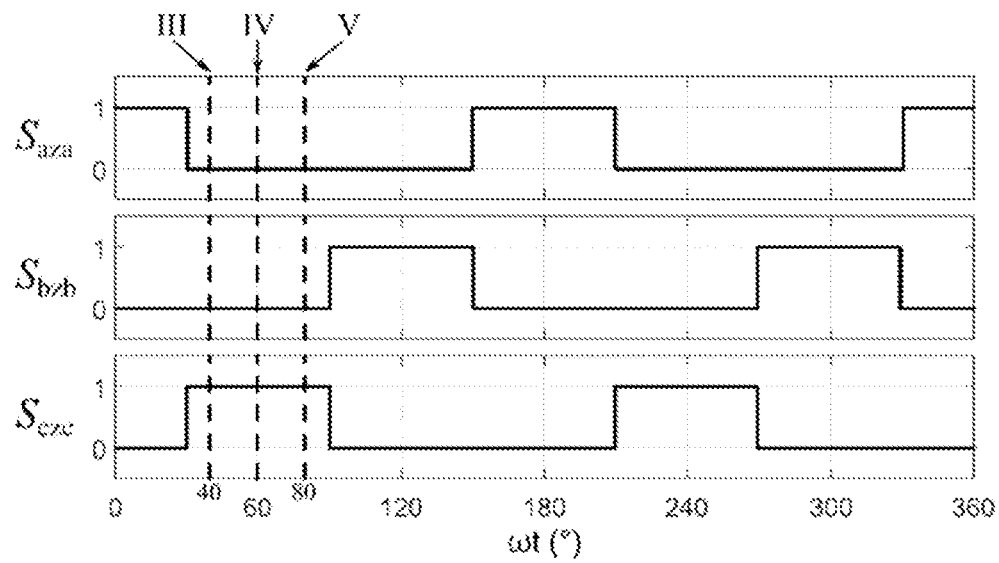

In a three-phase AC grid with substantially balanced phase voltages $v_a$, $v_b$, $v_c$, for example as shown in FIG. 2A, the three-phase AC input voltage (mains voltage) is converted into three intermediate DC voltages $v_{xz}$, $v_{zy}$, $v_{xy}$ which are shown in FIG. 2B and which are provided between the upper intermediate voltage node x, the lower intermediate voltage node y and the middle intermediate voltage node z. These DC voltages thus show piece-wise sinusoidal shapes. The conversion of the three-phase AC input voltage into three intermediate DC voltages is the result of the operation of the phase selector 11, as explained above. The switching states (switch on→S=1, switch off→S=0) of the selector switches $S_{aza}$, $S_{bzb}$, $S_{czc}$ are shown in FIG. 2C. It can be seen that the switches are 'on' or 'off' continuously during whole particular 60° sectors (e.g. from 30° to 90°, from 90° to 150°, etc.) within the period of the AC mains voltage (360°; corresponds with a time period of 20 ms for a 50 Hz grid frequency; also called a line cycle). Also the diodes of the phase selector are 'conducting' or 'not conducting' during whole particular sectors within the period (360°) of the AC mains voltage. Referring to FIG. 2A:

diode $D_{ax}$ conducts within 30°≤ωt<150°,
diode $D_{bx}$ conducts within 150°≤ωt<270°,
diode $D_{cx}$ conducts within 270°≤ωt<360° and 0°≤ωt<30°,
diode $D_{ya}$ conducts within 210°≤ωt<330°,
diode $D_{yb}$ conducts within 330°≤ωt<360° and 0°≤ωt<90°,
diode $D_{yc}$ conducts within 90°≤ωt<210°,
switch $S_{aza}$ conducts within 0°≤ωt<30° and 150°≤ωt<210° and 330°≤ωt<360°,
switch $S_{bzb}$ conducts within 90°≤ωt<150° and 270°≤ωt<330°,
switch conducts within 30°≤ωt<90° and 210°≤ωt<270°.

The combination of states (conducting/not conducting) of the switches and diodes is unique for every 60° sector of the three-phase AC input voltage and depends on the voltage value of the phase inputs A, B, C. The sequence of the 6 unique states of the switches and diodes repeats itself every period (360°) of the AC mains voltage.

Figure 2D:
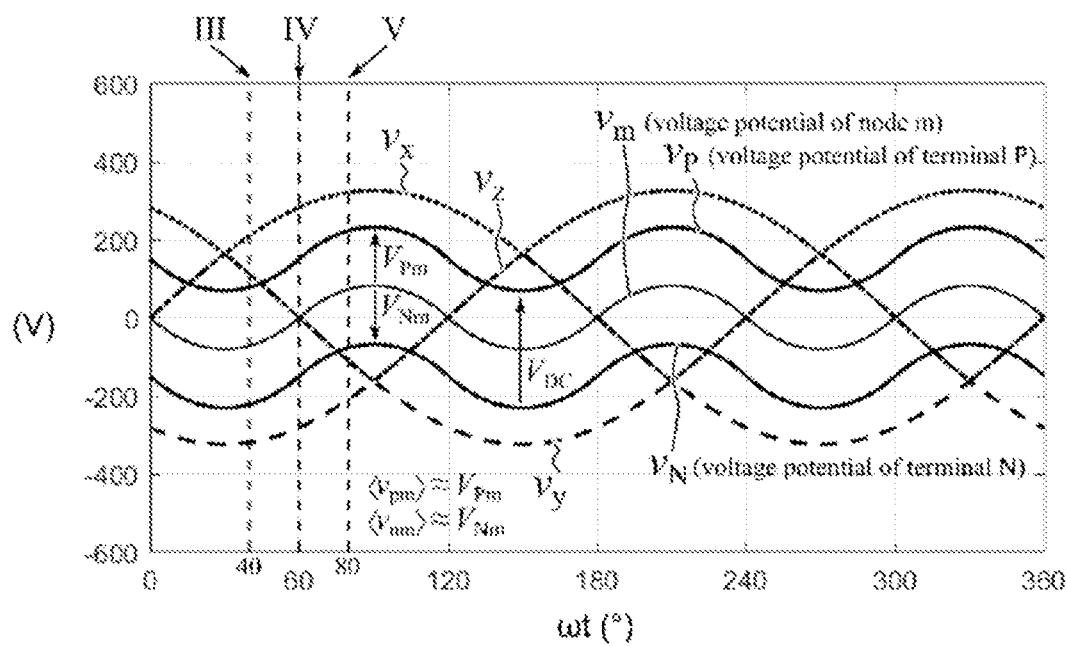

Seen from the viewpoint of the intermediate voltage nodes x, y, z towards the output terminals P, N, a DC-DC buck circuit (upper buck circuit) can be identified, having three input ports x, z, m and two output ports P, m, and comprising the upper buck bridge leg 18, the upper buck inductor $L_b$, and the upper output capacitor $C_{Pm}$. The voltage between input ports x and m of this upper buck circuit is the voltage $v_{cx}=v_x-v_m$ ($v_x$ and $v_m$ are shown in FIG. 2D) across capacitor $C_x$, the voltage between input ports z and m of this upper buck circuit is the voltage $v_{cz}=v_z-v_m$ ($v_z$ and $v_m$ are shown in FIG. 2D) across capacitor $C_z$, and the voltage between output ports P and m of this upper buck circuit is the voltage $V_{Pm}=v_P-v_m$ ($v_P$ and $v_m$ are shown in FIG. 2D) across the upper output capacitor $C_{Pm}$. $V_{Pm}$ has a voltage value that is substantially equal to half the total DC bus voltage ($V_{Pm} \approx V_{DC}/2$).

Seen from the viewpoint of the intermediate voltage nodes x, y, z towards the output terminals P, N, an 'inversed' (negative input voltage and negative output voltage) DC-DC buck circuit (lower buck circuit) can be identified, having three input ports y, z, m and two output ports N, m, and comprising the lower buck bridge leg 19, the lower buck inductor $L_n$, and the lower output capacitor $C_{mN}$. The voltage between input ports y and m of this lower buck circuit is the voltage $v_{cy}=v_y-v_m$ ($v_y$ and $v_m$ are shown in FIG. 2D) across capacitor $C_y$, the voltage between input ports z and m of this lower buck circuit is the voltage $v_{cz}=v_z-v_m$ ($v_z$ and $v_m$ are shown in FIG. 2D) across capacitor $C_z$, and the voltage between output ports N and m of this lower buck circuit is the voltage $V_{Nm}=v_N-v_m$ ($V_N$ and $v_m$ are shown in FIG. 2D) across the lower output capacitor $C_{mN}$. $V_{Nm}$ has a voltage value that is substantially equal to minus half the total DC bus voltage ($V_{Nm} \approx V_{DC}/2$).

By PWM modulation (pulse-width-modulation) of the control signals of switches $S_{xp}$ and $S_{zp}$ of the upper buck circuit at a specified, possibly variable, switching frequency $f_s$, the upper switch-node terminal p of the upper buck bridge leg 18 can be alternately connected to the upper intermediate voltage node x, the middle intermediate voltage z, or the common node m. This results in a switched voltage $v_{pm}$ between nodes p and m, the switched voltage $v_{pm}$ which may thus have three voltage levels. The duty-ratios (i.e. the relative on-time within a switching period $T_s=1/f_s$) of the PWM-modulated control signals of the switches $S_{xp}$ and $S_{zp}$ define the average value $\langle v_{pm} \rangle$ of voltage $v_{pm}$ within a switching period. Control of these duty-ratios, and thus also control of the switching-cycle-averaged value $\langle v_{pm} \rangle$, allows to control the switching-cycle-averaged value $\langle i_{Lp} \rangle$ of the current $i_{Lp}$ in the upper buck inductor $L_p$, e.g. using a closed-loop PI (Proportional-Integrating) control structure. Additionally, control of these duty-ratios allows to control the switching-cycle-averaged values $\langle i_x \rangle$ and/or $\langle i_{zp} \rangle$ of input currents $i_x$ and $i_{zp}$ of the upper buck bridge leg 18 by directing the inductor current $i_{Lp}$ to flow through $S_{xp}$ ($=i_x$) for a certain amount of time (i.e. during the on-interval of $S_{xp}$), and through $S_{zp}D_{zp}$ (=$i_{zp}$) for a certain amount of time (i.e. during the on-interval of $S_{zp}$).

By PWM modulation (pulse-width-modulation) of the control signals of switches $S_{ny}$ and $S_{nz}$ of the lower buck circuit at a specified, possibly variable, switching frequency $f_s$, the lower switch-node terminal n of the lower buck bridge leg 19 can be alternately connected to the lower intermediate voltage node y, the middle intermediate voltage z, or the common node m. This results in a switched voltage $v_{mn}$ between nodes m and n, the switched voltage $v_{mn}$ which may thus have three voltage levels. The duty-ratios (i.e. the relative on-time within a switching period $T_s=1/f_s$) of the PWM-modulated control signals of the switches $S_{ny}$ and $S_{nz}$ define the average value $\langle v_m \rangle$ of voltage $v_{mn}$ within a switching period. Control of these duty-ratios, and thus also control of the switching-cycle-averaged value $\langle v_m \rangle$, allows to control the switching-cycle-averaged value $\langle i_{Ln} \rangle$ of the current $i_{Ln}$ in the lower buck inductor $L_N$, e.g. using a closed-loop PI (Proportional-Integrating) control structure. Additionally, control of these duty-ratios allows to control the switching-cycle-averaged values $\langle i_y \rangle$ and/or $\langle i_{zn} \rangle$ of input currents $i_y$ and $i_{zn}$ of the lower buck bridge leg 19 by directing the inductor current $i_{Ln}$ to flow through $S_{ny}$(=$i_y$) for a certain amount of time (i.e. during the on-interval of $S_{ny}$), and through $D_{nz}S_{nz}$(=$i_{zn}$) for a certain amount of time (i.e. during the on-interval of $S_{nz}$).

The current $i_z$ is equal to the sum of the input current $i_{zp}$ of the upper buck circuit and the input current $i_{zn}$ of the lower buck circuit ($i_z=i_{zp}+i_{zn}$), which is also true for the switching-cycle-averaged values of these currents ($\langle i_z \rangle = \langle i_{zp} \rangle + \langle i_{zn} \rangle$).

Generally, it can be said that the HF components of currents $i_x$, $i_y$, $i_z$ at the input of the output power stage 12 are largely filtered by HF filter capacitors $C_x$, $C_y$, $C_z$. As a result, the currents $i'_x$, $i'_y$, $i'_z$ at the output of the phase selector 11 are largely equal to the switching-cycle-averaged values $\langle i_x \rangle$, $\langle i_y \rangle$, $\langle i_z \rangle$ of currents $i_x$, $i_y$, $i_z$, i.e., $i'_x \approx \langle i_x \rangle$, $i'_y \approx \langle i_y \rangle$, $i'_z \approx \langle i'_z \rangle$.

The duty cycle ratios of the PWM control signals of the switches $S_{xp}$ and $S_{zp}$ are such that the switching-cycle-averaged value ($v_{pm}$) is substantially equal to half the total DC bus voltage ($\langle v_{pm} \rangle = V_{Pm} \approx V_{DC}/2$; see FIG. 2D), while the duty cycle ratios of the PWM control signals of the switches $S_{ny}$ and $S_{nz}$ are such that the switching-cycle-averaged value $\langle v_{nm} \rangle$ is substantially equal to minus half the total DC bus voltage ($\langle v_{nm} \rangle = V_{Nm} \approx -V_{DC}/2$; see FIG. 2D). This means that the switching-cycle-averaged voltages (i.e. the volt-seconds products) of both the upper buck inductor $L_p$ and the lower buck inductor L are substantially equal to zero.

Figure 2E:
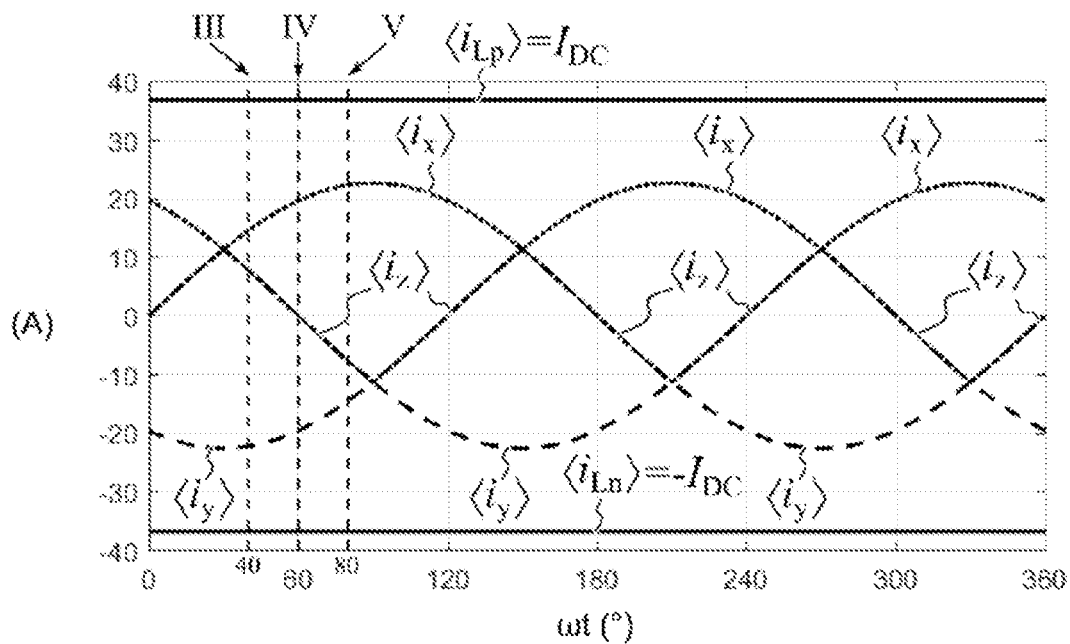

An example of the switching-cycle-averaged values $\langle i_{Lp} \rangle$, $\langle i_{La} \rangle$ of currents $i_{Lp}$, $i_{Ln}$ in the inductors $L_p$, L is shown in FIG. 2E. As can be seen, current $i_{Lp}$ may be controlled to have a switching-cycle-averaged value equal to a requested DC output current ($\langle i_{Lp} \rangle = I_{DC}$) while current $i_{Ln}$ may be controlled to have a switching-cycle-averaged value equal to minus the requested DC output current ($\langle i_{Ln} \rangle = I_{DC}$).

Figure 2F:
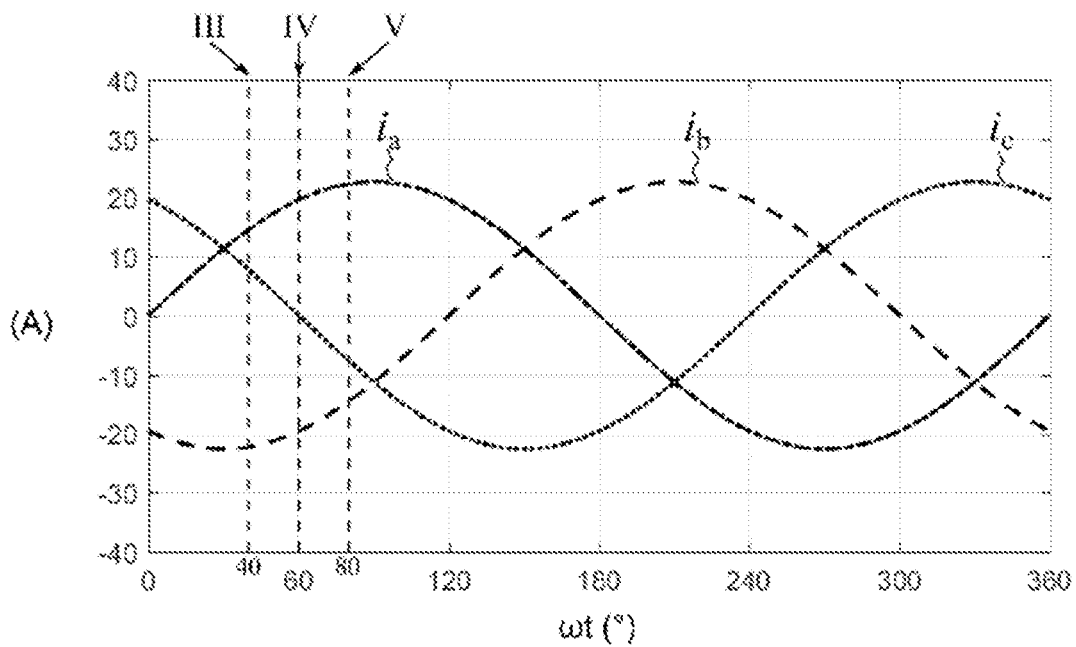

Also shown in FIG. 2E is an example of the switching-cycle-averaged values $\langle i_x \rangle$, $\langle i_y \rangle$, $\langle i_z \rangle$ of currents $i_x$, $i_y$, $i_z$. As can be seen, these currents may be controlled to have piece-wise sinusoidal shapes. The currents $i'_x = \langle i_x \rangle$, $i'_y = \langle i_y \rangle$, $i'_z = \langle i_z \rangle$ at the output of the phase selector 11 are thus having the same piece-wise sinusoidal shapes and are transformed, i.e., as a result of the operation of the phase selector 11, into three sinusoidal AC phase currents $i_a$, $i_b$, $i_c$ which are shown in FIG. 2F, realizing Power Factor Correction (PFC) operation of the electrical converter 10.

Figure 2G:
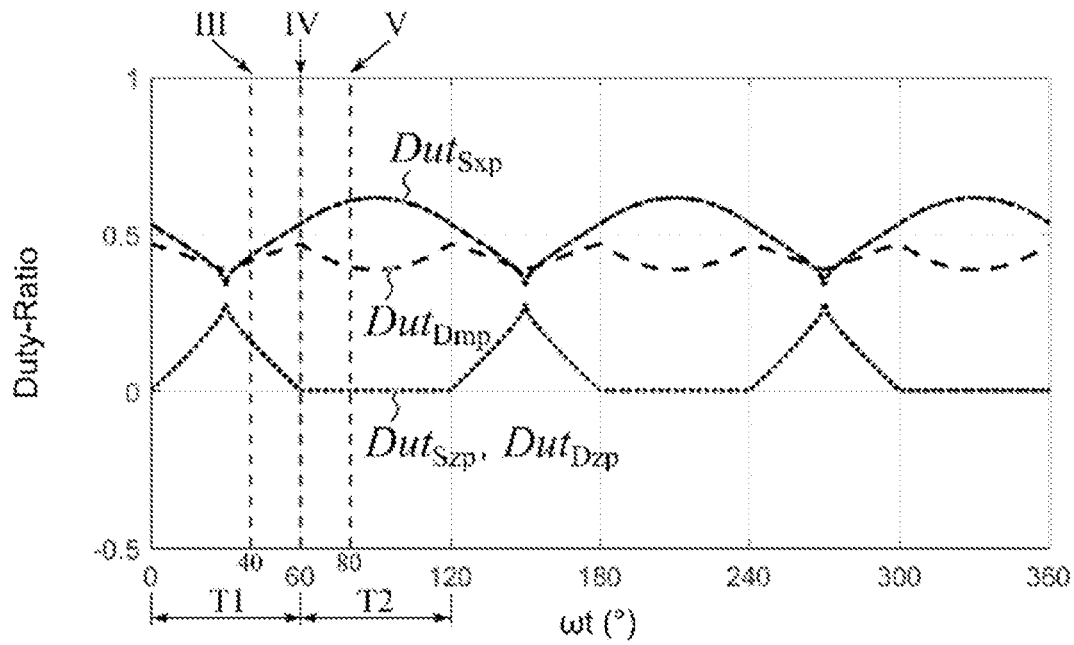
Figure 2H:
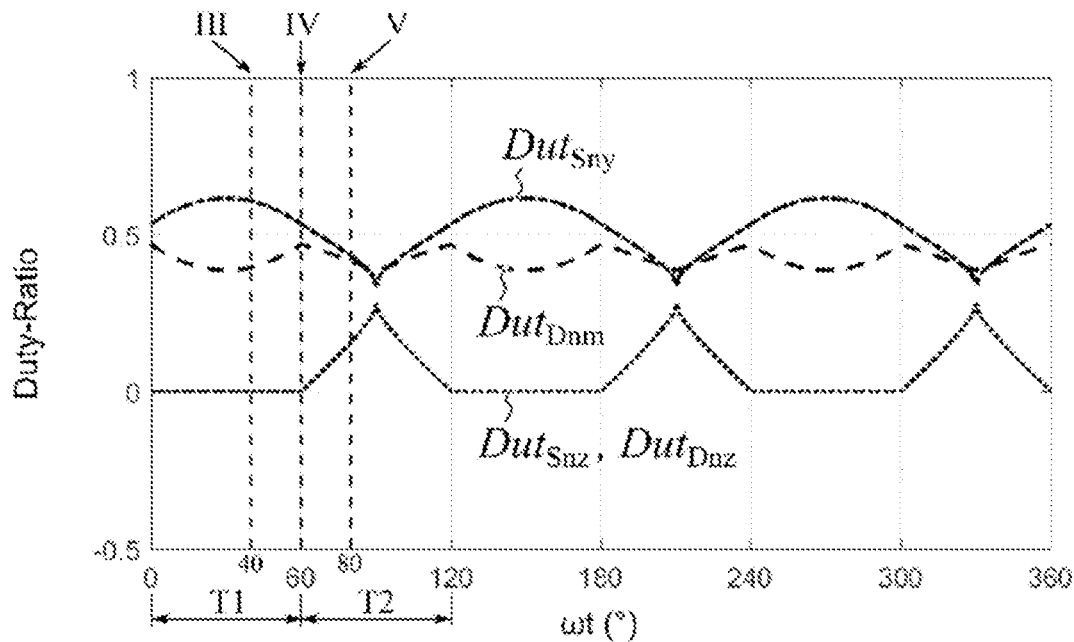

FIG. 2G shows examples of the duty-cycles (with duty-cycle ut: 0≤Dut≤1, where Dut=0 means continuously 'off' within a switching period $T_s$ and Dut=1 means continuously 'on' within a switching period $T_s$) of the switches and diodes ($S_{xp}$, $S_{zp}$, $D_{zp}$), $D_{mp}$) of the upper buck bridge leg 18 and FIG. 2H shows the duty-cycles of the switches and diodes ($S_{ny}$, $S_{nz}$, $D_{nz}$, $D_{nm}$) of the lower buck bridge leg 19. These duty-cycles correspond with the examples of FIGS. 2A-2F.

Figure 2I:
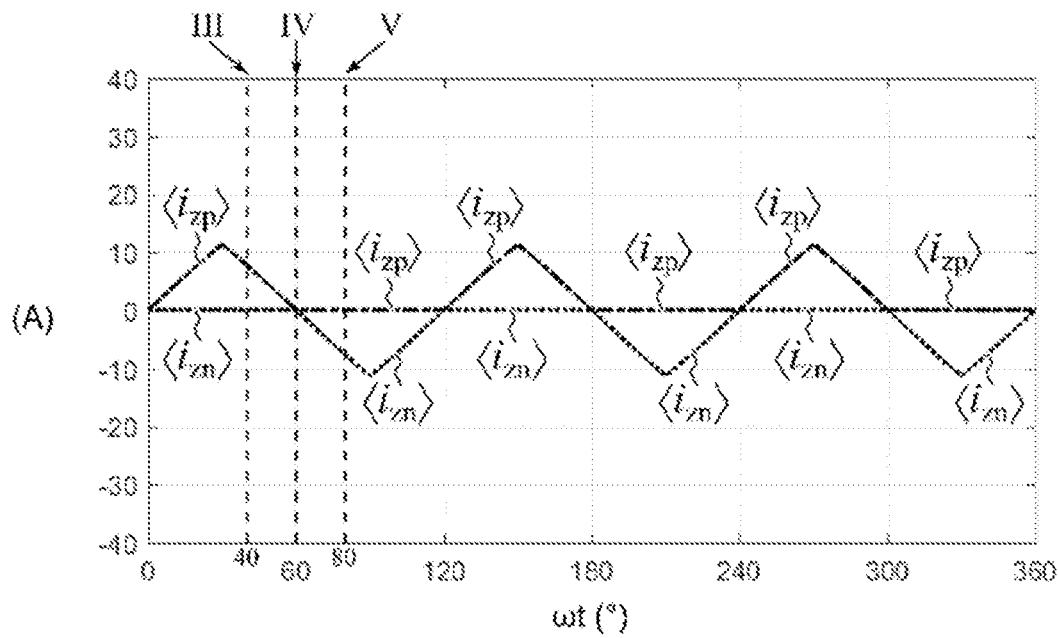

As can be seen from FIG. 2H, the duty-ratio of the control signal of switch $S_{nz}$ equals zero during certain intervals within the line cycle of the mains voltage, i.e., in these intervals the switch $S_{nz}$ is continuously open (not conducting). Conform FIG. 2B this is the case for the intervals where $v_{zy}>v_{xz}$. This means that the current $i_{zn}$ (and its switching-cycle-averaged value $\langle i_{zn} \rangle$) is zero during these intervals, resulting in $i'_z = \langle i_z \rangle = \langle i_{zp} \rangle$ (>0) during these intervals, as can also be seen from FIGS. 2I and 2E. Similarly, and as can be seen from FIG. 2G, the duty-ratio of the control signal of switch $S_{zp}$ equals zero during certain intervals within the line cycle of the mains voltage, i.e., in these intervals the switch $S_{zp}$ is continuously open (not conducting). Conform FIG. 2B this is the case for the intervals where $v_{zy}<v_{xz}$. This means that the current $i_{zp}$ (and its switching-cycle-averaged value ($i_{zp}$)) is zero during these intervals, resulting in $i'_z = \langle i_z \rangle = \langle i_{zn} \rangle$ (<0) during these intervals, as can also be seen from FIGS. 2I, 2E. As shown in FIGS. 2G and 2H, the stepping down step performed by the upper and lower buck circuit comprises alternately (i.e. using a PWM signal) connecting the middle intermediate node z to an upper switch-node terminal p of the upper buck circuit during a first time interval T1 (where $v_{zy}>v_{xz}$) and to a lower switch-node terminal n of the lower buck circuit during a second time interval T2 (where $v_{zy}<v_{xz}$). During the first time interval T1, the switch $S_{zp}$ is continuously switched on and off with a switching frequency and a first varying duty cycle and the switch $S_{nz}$ is off. During the second time interval T2, the switch $S_{zp}$ is off, and the switch $S_{nz}$ is continuously switched on and off with a switching frequency and a second varying duty cycle.

Figure 2J:
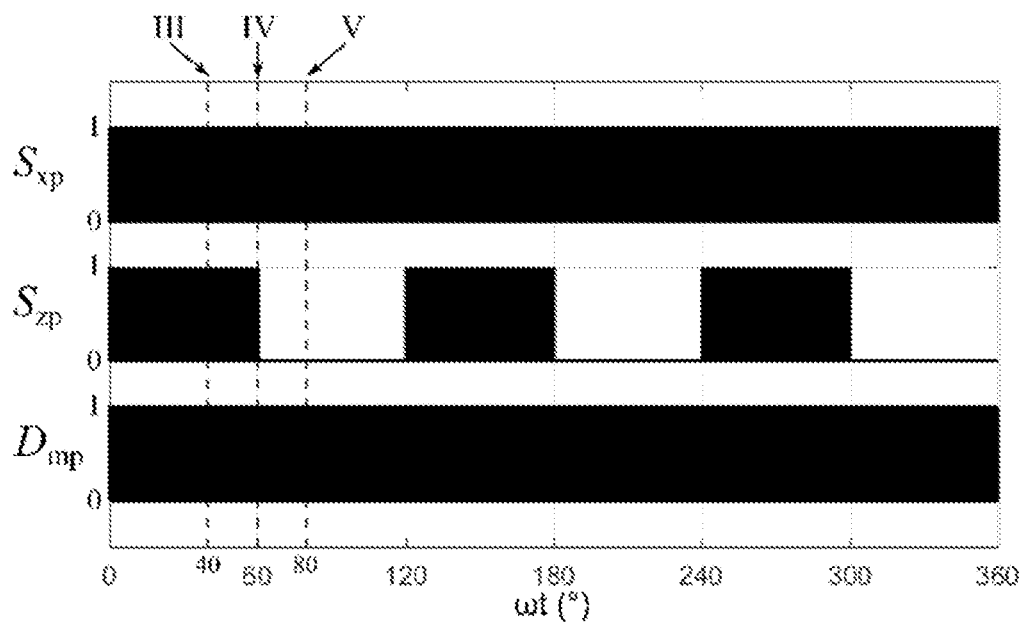
Figure 2K:
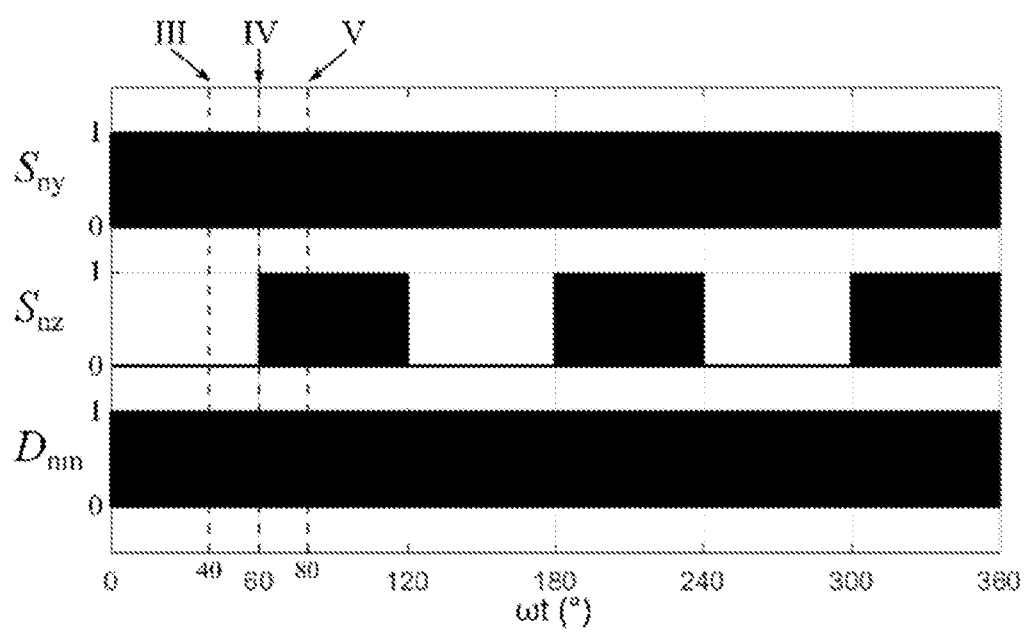

FIG. 2J shows the states of the switches $S_{xp}$ and $S_{zp}$ of the upper buck bridge leg 18, and FIG. 2K shows the states of the switches $S_{ny}$ and $S_{nz}$ of the lower buck bridge leg 19, within a line cycle of the mains voltage. The switches $S_{xp}$, $S_{zp}$, $S_{ny}$, $S_{nz}$ are all PWM modulated at a frequency (i.e. the switching frequency $f_s$; e.g. 100 kHz) that is substantially higher than the mains frequency (e.g. 50 Hz), as can be seen from the black-colored bars, indicating PWM modulation of the corresponding switch. As mentioned above, switch $S_{nz}$ is continuously open (not conducting) during the intervals within the line cycle of the mains voltage where $v_{zy}>v_{xz}$, while switch $S_{zp}$ is continuously open (not conducting) during the intervals within the line cycle of the mains voltage where $v_{zy}<v_{xz}$.

Figure 3:
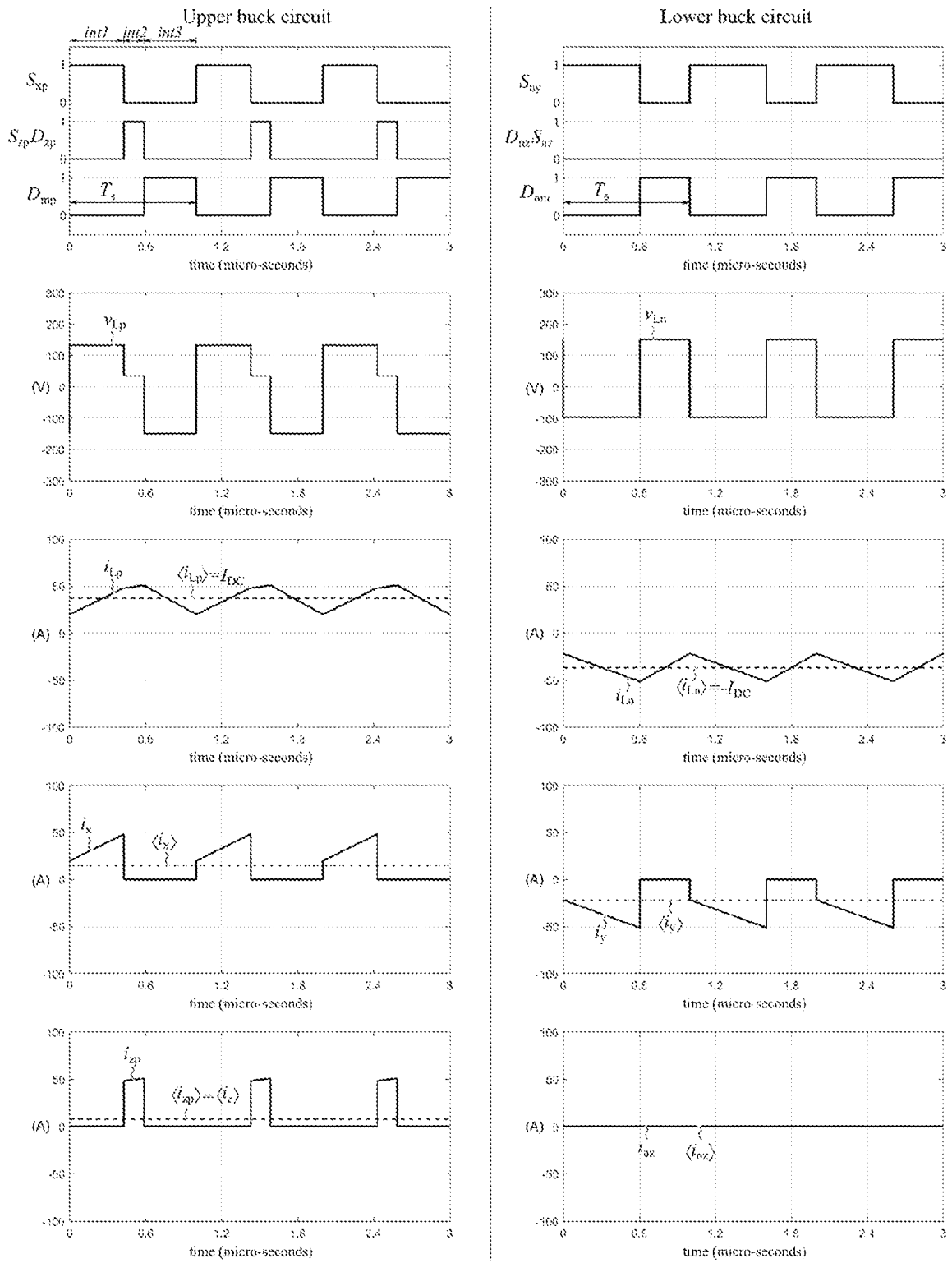
FIG. 3 illustrates various charts plotting various control signals, voltages, currents and control signals in function of time (microseconds), when $\omega t=40°$, see reference numeral III in FIGS. 2A-2K.
Figure 4:
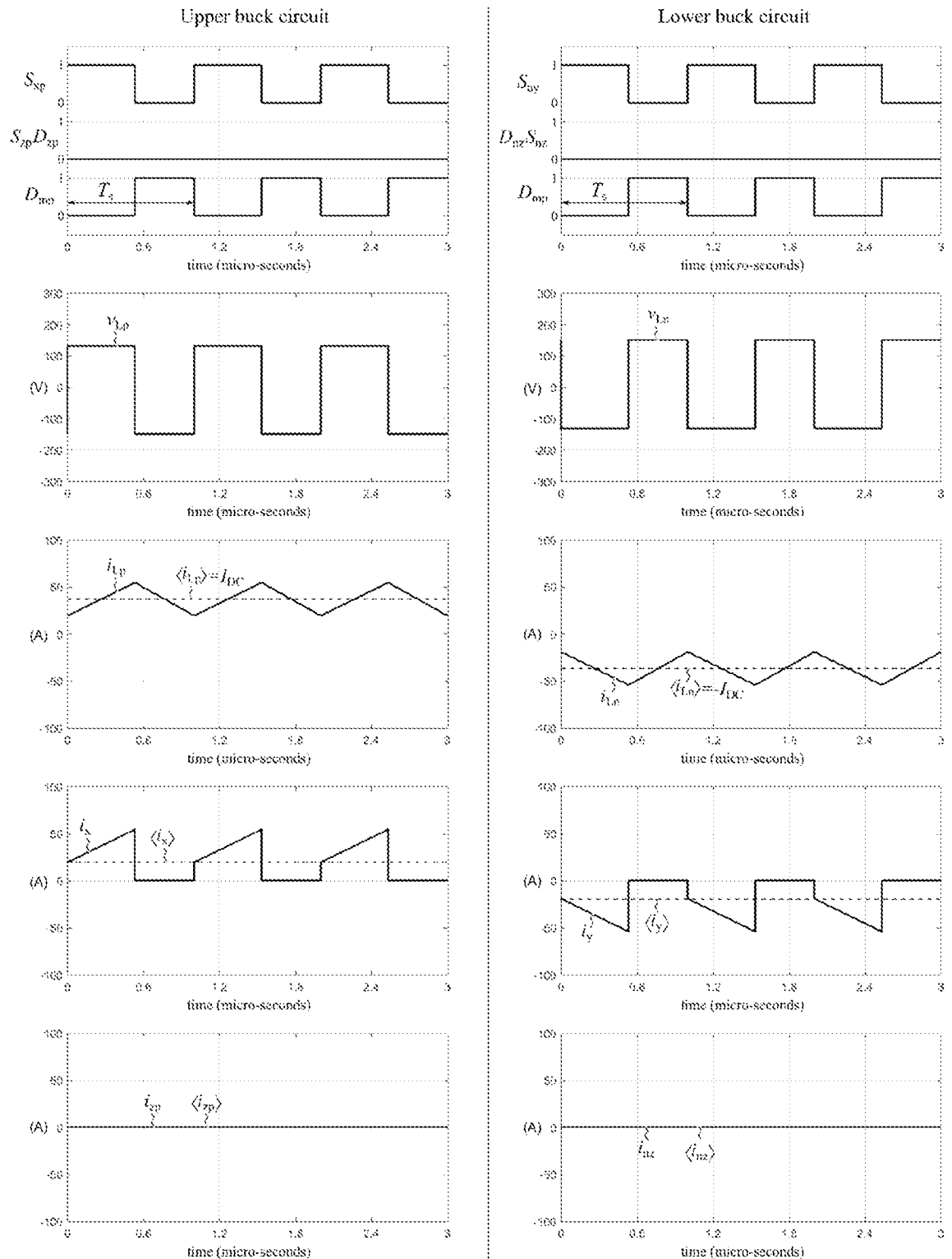
FIG. 4 illustrates various charts plotting various control signals, voltages, currents and control signals in function of time (microseconds), when $\omega t=60°$, see reference numeral IV in FIGS. 2A-2K.
Figure 5:
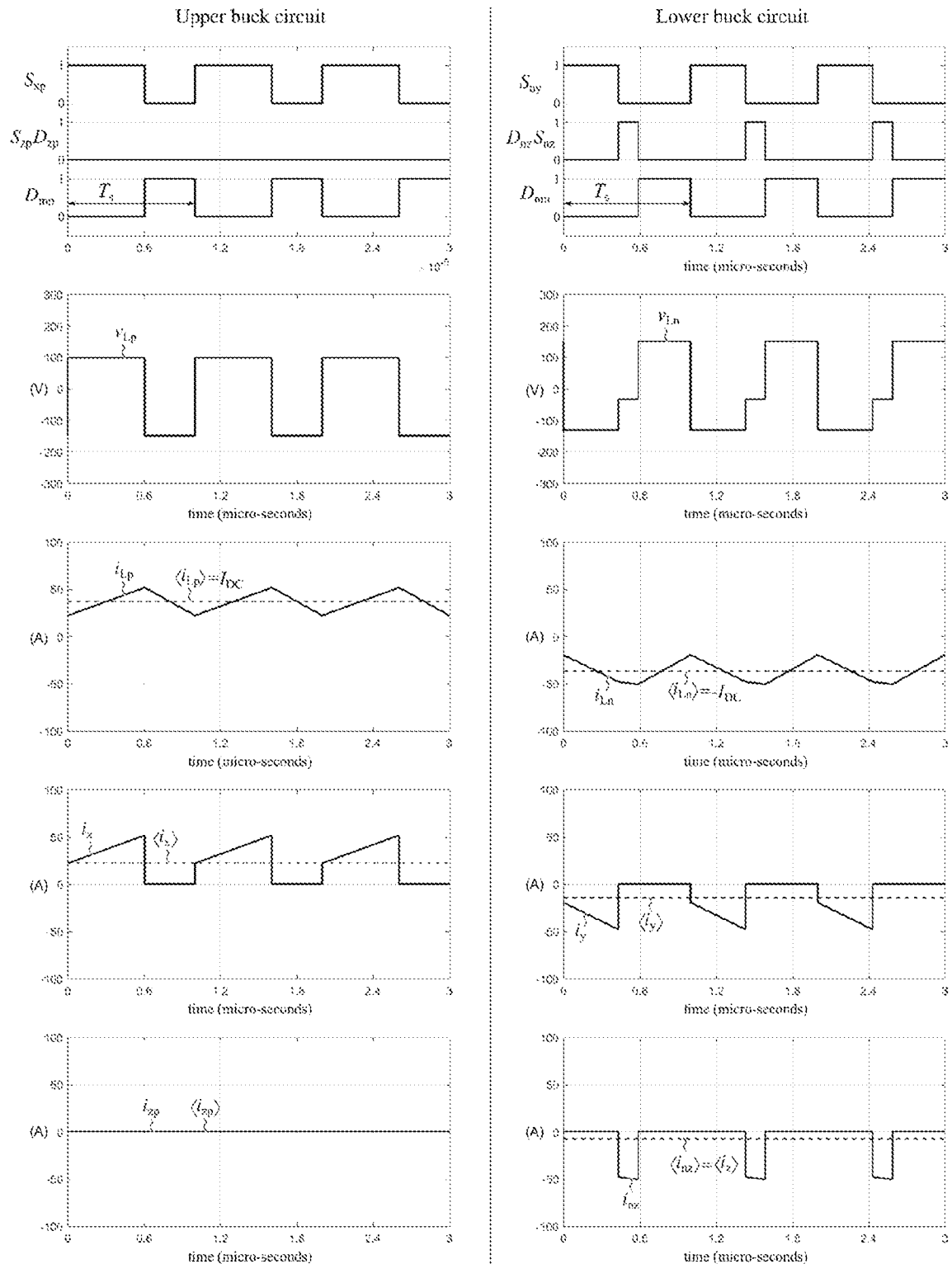
FIG. 5 illustrates various charts plotting various control signals, voltages, currents and control signals in function of time (microseconds), when ωt=80°, see reference numeral V in FIGS. 2A-2K.
Figure 6A:
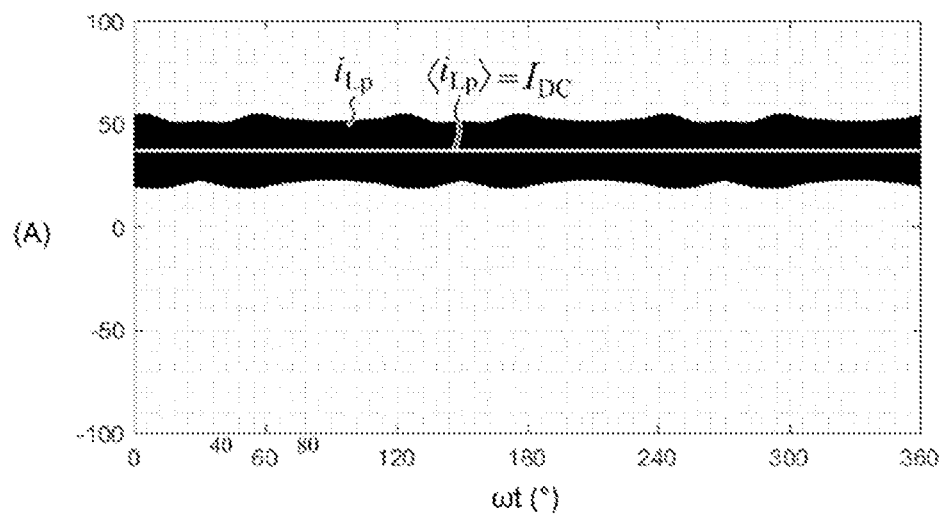
FIGS. 6A-E illustrate various charts plotting various currents in function of ωt(°) for the exemplary embodiment of FIG. 1.
Figure 6B:
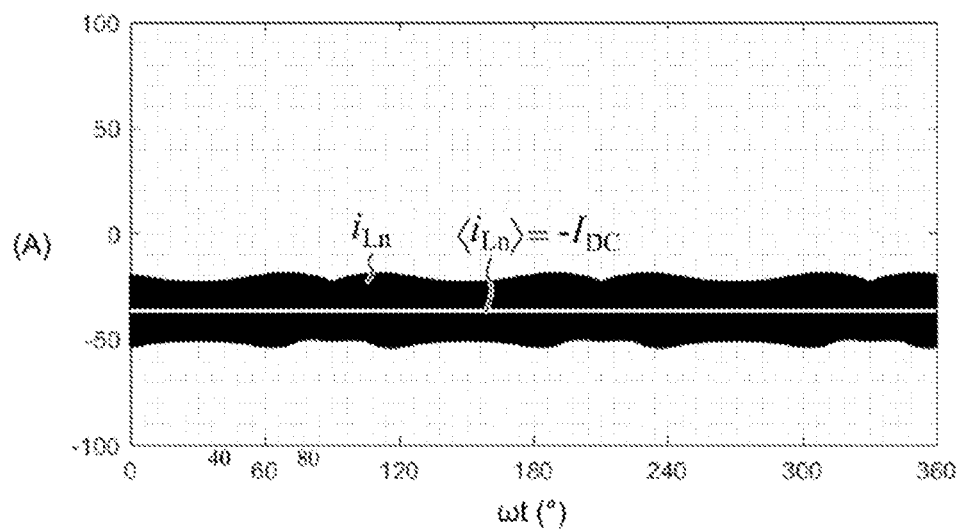
Figure 6C:
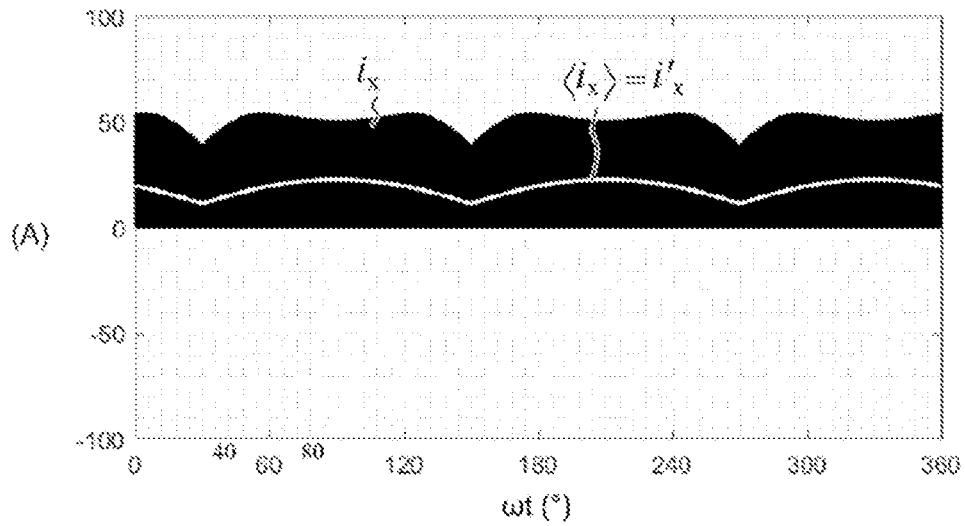
Figure 6D:
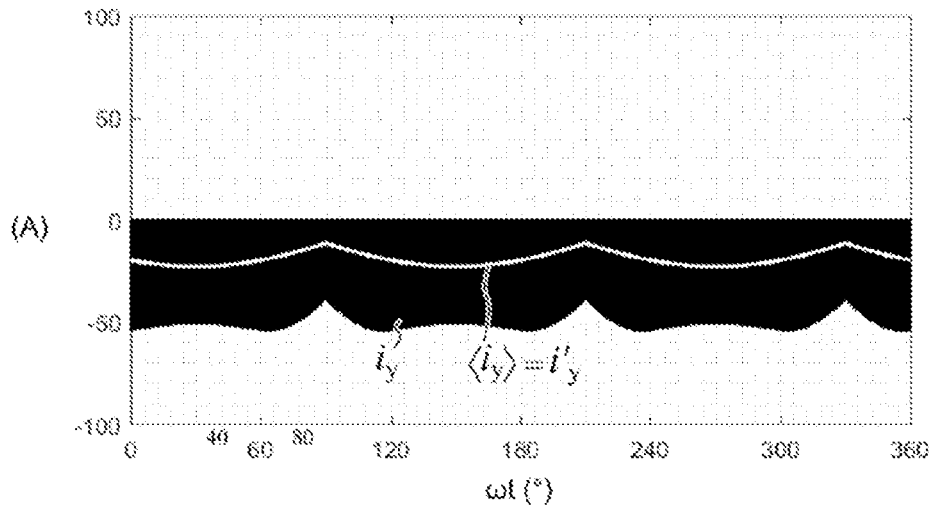
Figure 6E:
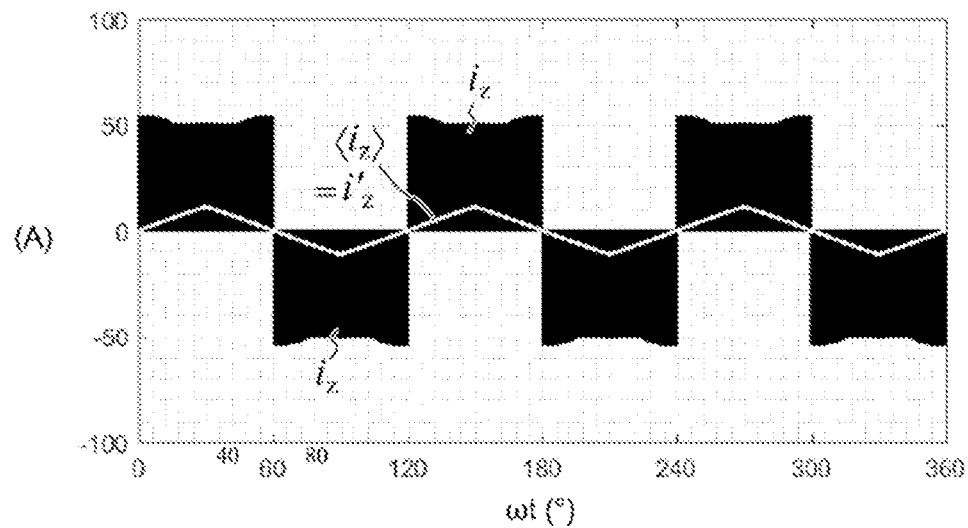

FIGS. 3-5 show diagrams of currents, voltages, and switching signals on a milliseconds time axis, i.e. regarding three consecutive switching cycles of the bridge legs of the output power stage 12 of the electrical converter 10. Each switching cycle has a switching period $T_s$ equal to $1/f_s$, with fS the switching frequency. FIG. 3 corresponds with a time interval around ωt=40° within the line cycle of the mains voltage (see reference numeral III in FIGS. 2A-2K), FIG. 4 corresponds with a time interval around ωt=60° within the line cycle of the mains voltage (see reference numeral IV in FIGS. 2A-2K), and FIG. 5 corresponds with a time interval around ωt=80° within the line cycle of the mains voltage (see reference numeral V in FIGS. 2A-2K). For all FIGS. 3-5, the selector switches and diodes of the phase selector 11 are in the following switching states, see also FIG. 2C:

- Switch $S_{aza}$=0 (off), diode $D_{ax}$=1 (conducting), diode $D_{ya}$=0 (blocking); phase connection a is connected with node x;
- Switch $S_{bzb}$=0 (off), diode $D_{bx}$=0 (blocking), diode $D_{yb}$=1 (conducting); phase connection b is connected with node y;
- Switch $S_{czc}$=1 (on), diode $D_{cx}$=0 (blocking), diode $D_{yc}$=0 (blocking); phase connection c is connected with node z.

The left columns ('upper buck circuit') of FIGS. 3-5 correspond with the operation of the upper buck circuit, while the right columns (lower buck circuit') of FIGS. 3-5 correspond with the operation of the lower buck circuit. Each of FIGS. 3-5 shows:

- the control signals of the switches and diodes $S_{xp}$, $S_{zp}$, $D_{mp}$, $D_{mp}$ of the PWM-modulated upper buck bridge leg 18, and the control signals of the switches and diodes $S_{ny}$, $S_{nz}$, $D_{zz}$, $D_{nm}$ of the PWM-modulated lower buck bridge leg 19; '1' means 'on' and conducting, and '0' means 'off' and not conducting; see first rows of FIGS. 3-5,
- the voltage $v_{Lp}$ across the upper buck inductor $L_p$ and the voltage $v_{Ln}$ across the lower buck inductor $L_n$; see second rows of FIGS. 3-5,
- the current $i_{Lp}$ in the upper buck inductor $L_p$ (and the switching-cycle-averaged value, $\langle i_{Lp} \rangle = I_{DC}$, of this current), and the current $i_{Ln}$ in the lower buck inductor $L_n$ (and the switching-cycle-averaged value, $\langle i_{ca} \rangle = -I_{DC}$, of this current); see third rows of FIGS. 3-5,
- the input current G of the upper buck bridge leg 18 (and the switching-cycle-averaged value $\langle i_{zp} \rangle$ of this current) and the input current $i_y$ of the lower buck bridge leg 19 (and the switching-cycle-averaged value $\langle i_{nz} \rangle$ of this current); see fourth rows of FIGS. 3-5,
- the input current $i_{zn}$ of the upper buck bridge leg 18 (and the switching-cycle-averaged value $\langle i_{zn} \rangle$ of this current) and the input current $i_{nz}$ of the lower buck bridge leg 19 (and the switching-cycle-averaged value $\langle i_{nz} \rangle$ of this current); see fifth rows of FIGS. 3-5.

In the regarded time interval of FIG. 3, i.e., around ωt=40° within the line cycle of the mains voltage (see reference numeral III in FIGS. 2A-2K), $v_{zy} > v_{xz}$, $i'_z = \langle i_{zp} \rangle = \langle i_{zn} \rangle$, and $\langle i_{zn} \rangle = 0$, i.e., the duty-ratio of the control signal of switch $S_{nz}$ equals zero (switch $S_{nz}$ is continuously open; not conducting).

In the regarded time interval of FIG. 4, i.e., around ωt=60° within the line cycle of the mains voltage (see reference numeral IV in FIGS. 2A-2K), $v_{zy} = v_{xz}$, $\langle i_{zp} \rangle = 0$, $\langle i_{zn} \rangle = 0$, and $i'_z = \langle i_i \rangle = \langle i_{zp} \rangle + \langle i_{nz} \rangle = 0$, i.e., the duty-ratio of the control signals of switches $S_{zn}$ and $S_{nz}$ equals zero (switches $S_{zn}$ and $S_{nz}$ are continuously open; not conducting).

In the regarded time interval of FIG. 5, i.e., around ωt=80° within the line cycle of the mains voltage (see reference numeral V in FIGS. 2A-2K), $v_{zy} < v_{xz}$, $\langle i_{zp} \rangle = 0$, and $i'_z = \langle i_z \rangle = \langle i_{nz} \rangle$, i.e., the duty-ratio of the control signal of switch $S_{zn}$ equals zero (switch $S_{zn}$ is continuously open; not conducting).

In FIGS. 3-5, the semiconductor devices (switches and diodes) of the buck bridge legs 18, 19 of the output power stage 12 are sequentially conducting. For example, in FIG. 3 the conduction sequence of the switches and diodes of the PWM-modulated upper buck bridge leg 18 within a switching period $T_s(=1/f_s)$ is as follows:

- Interval 1 (int1; see left upper figure inset of FIG. 3): $S_{xp}$ conducts while $S_{zp} D_{zp}$ and $D_{mp}$ do not conduct;
- Interval 2 (int2; see left upper figure inset of FIG. 3): $S_{zp} D_{zp}$ conducts while $S_{xp}$ and $D_{mp}$ do not conduct,
- Interval 3 (int3; see left upper figure inset of FIG. 3): $D_{mp}$ conducts while $S_{xp}$ and $S_{zp} D_{zp}$ do not conduct.

During intervals 1, 2 and 3, $S_{ny}$ is switched such that it is on when $S_{zp} D_{zp}$ or $D_{mp}$ conducts (i.e. whilst $D_{mp}$ is off) and hence $D_{nm}$ switches simultaneously with $D_{mp}$ (see right upper figure inset of FIG. 3). This sequence repeats itself in the following switching period. It is noted that this is merely an example, and that the upper and lower buck circuits may operate independently of each other. For example, the operation of the first and second buck circuit may be interleaved, resulting in an overlap of the on-time of $D_{mp}$ and $D_{nm}$. Different conduction sequences, possibly including more intervals, may also be used for the buck bridge legs. For example, in FIG. 3 a fourth conduction interval may be added to the conduction sequence of the switches and diodes of the PWM-modulated upper buck bridge leg 18 within a switching period $T_s(=1/f_s)$, which may result in:

- Interval 1 (int1'): $S_{xp}$ conducts while $S_{zp} D_{zp}$ and $D_{pm}$ do not conduct,
- Interval 2 (int2'): $S_{zp} D_{zp}$ conducts while $S_{xp}$ and $D_{pm}$ do not conduct,
- Interval 3 (int3'): $D_{pm}$ conducts while $S_{xp}$ and $S_{zp} D_{zp}$ do not conduct,
- Interval 4 (int4'): $S_{zp} D_{zp}$ conducts while $S_{xp}$ and $D_{pm}$ do not conduct'.

As can be seen in FIGS. 2G and 2H, the duty cycle of $S_{xp}$ ($Dut_{sxp}$) may be increased and decreased synchronously with the voltage $v_x$, the duty cycle ($Dut_{sny}$) of $S_{ny}$ may be increased and decreased synchronously with the voltage $-v_y$, the duty cycle of $S_{zp}$ ($Dut_{szp}$) may be increased and decreased synchronously with the voltage $v_z$ when $v_{zy} > v_{xz}$ and the duty cycle of $S_{naz}$ ($Dut_{Snz}$) may be increased and decreased synchronously with the voltage $v_z$ when $v_{zy} < v_{xz}$.

FIGS. 6A-E show respectively the currents $i_{Lp}$, $i_{Ln}$, $i_x$, $i_y$, $i_z$ within a whole line cycle (360°) of the mains voltage. Also shown are the switching-cycle-averaged values $\langle i_{Lp} \rangle$, $\langle i_{Ln} \rangle$, $\langle i_x \rangle$, $\langle i_y \rangle$, $\langle i_z \rangle$ of these currents which correspond with the currents shown in FIG. 2E.

In order to minimize the Total Harmonic Distortion (THD) of the AC input current of the electrical converter, the high-frequency ripple of phase currents $i_a$, $i_b$, $i_c$ is advantageously minimized, which is taken care of by the input filter 13.

Compared to embodiments where the first and second buck circuit are connected in parallel between the upper and lower intermediate node, embodiments of the present disclosure have the advantage that the currents can be lower. Indeed, when two buck circuits are connected in parallel between the upper and lower intermediate node, wherein one buck circuit is connected to the positive node and the other one to the negative node, one buck circuit sees the reverse current of the other buck circuit, resulting in higher currents. This disadvantage is not present when two buck circuits are connected in series between the upper and lower intermediate node as in embodiments of the present disclosure.

Figure 7:
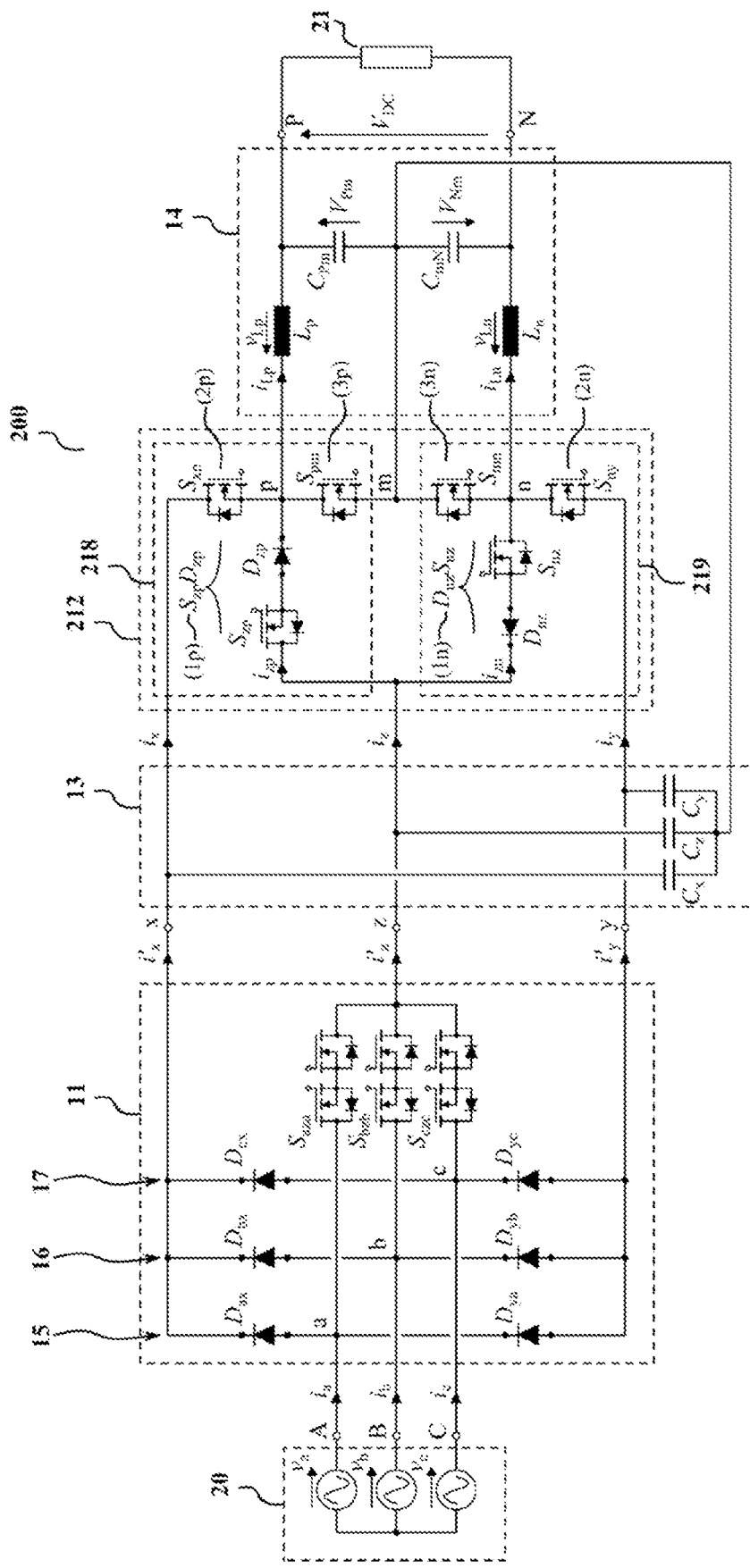
FIG. 7 is a circuit diagram of another exemplary embodiment of an electrical converter.
Figure 8A:
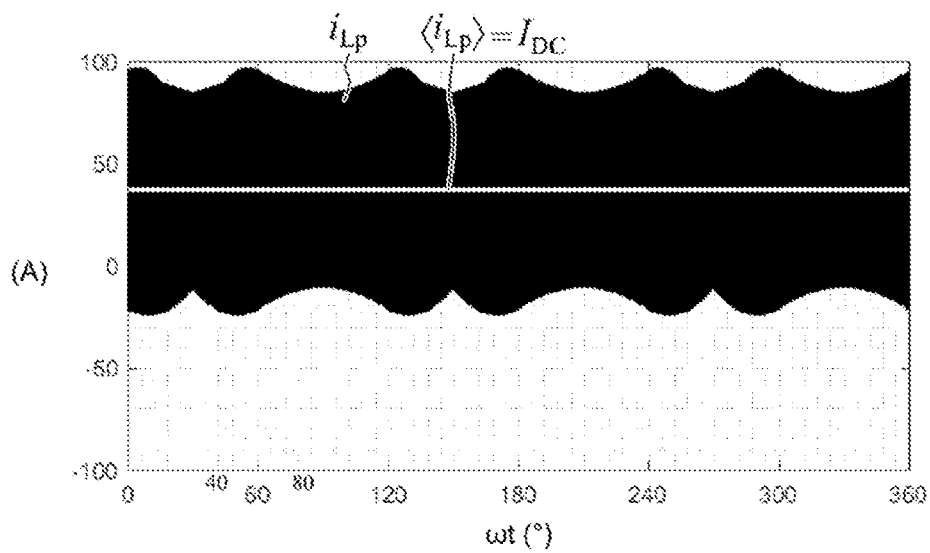
FIGS. 8A-E illustrate various charts plotting the same currents in function of ωt(°) as in FIG. 6 but for the exemplary embodiment of FIG. 7.
Figure 8B:
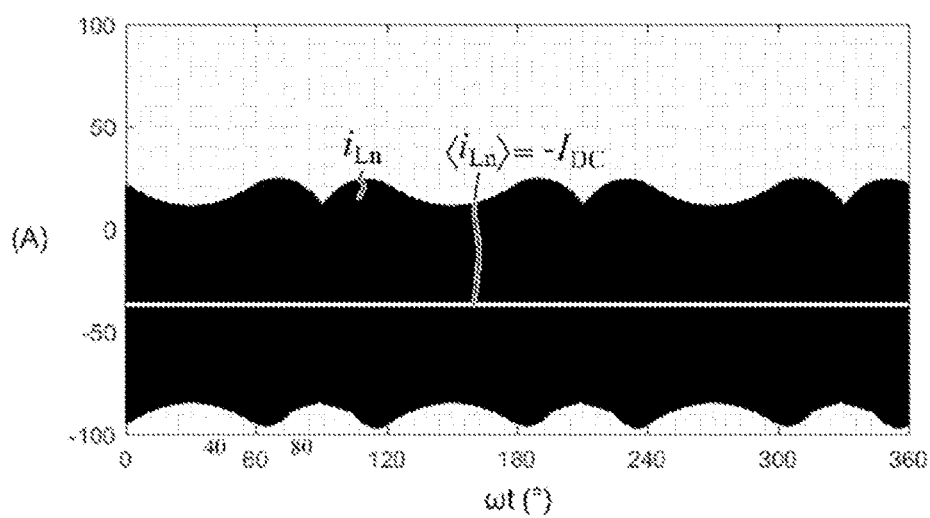
Figure 8C:
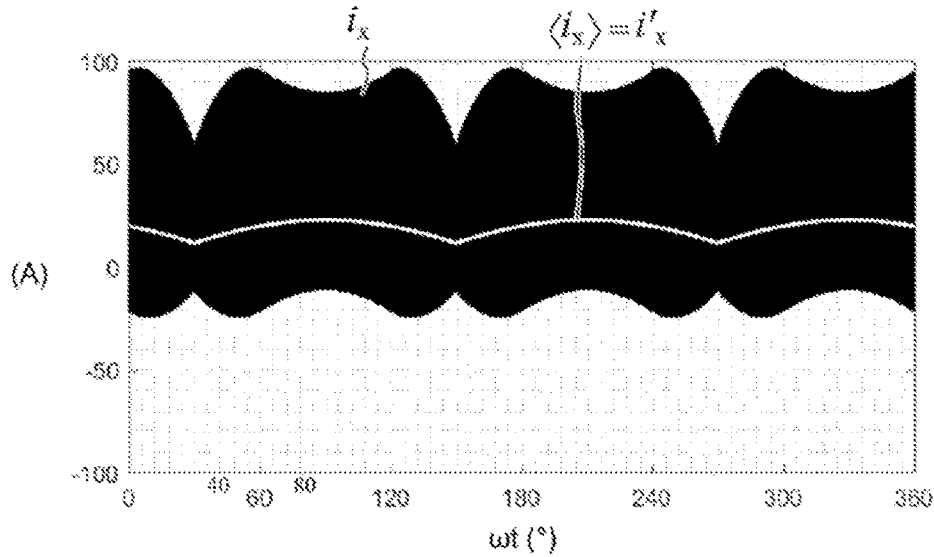
Figure 8D:
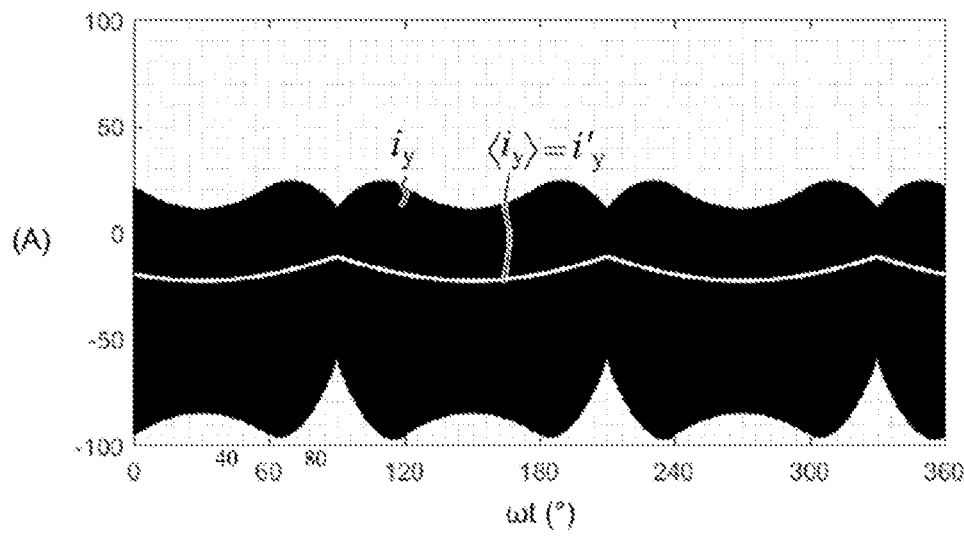
Figure 8E:
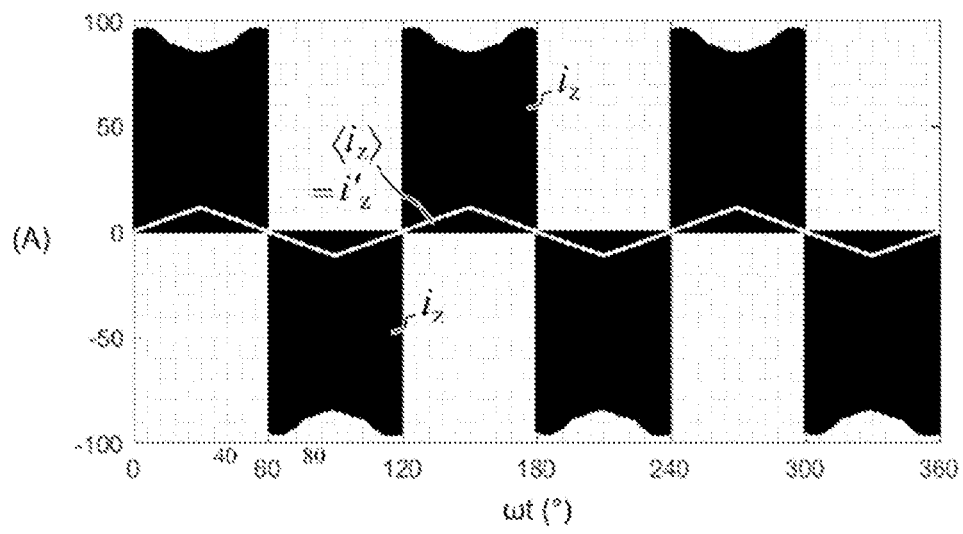

In FIG. 7, an electrical converter 200 is shown which differs from converter 10 in that the third and sixth semiconductor devices 3p, 3n are different: diodes $D_{mp}$, $D_{nm}$ of the output power stage 12 of the converter shown in FIG. 1 have been replaced with controllable semiconductor switches $S_{pm}$, $S_{mn}$, in this case MOSFETs, in the output power stage 212. This allows for the inductor current $\langle i_{Lp} \rangle$ to also become negative within the conduction interval of $S_{pm}$ and for the inductor current $\langle i_{Ln} \rangle$ to also become positive within the conduction interval of $S_{mn}$, which was not possible for the implementation of the output power stage 12 with diodes ($D_{mp}$, $D_{nm}$). As a result, quasi-lossless zero-voltage switching (ZVS) of all the semiconductor switches ($S_{xp}$, $S_{zp}$, $S_{pm}$, $S_{ny}$, $S_{nz}$, $S_{mn}$) of the output power stage 212 is possible. This allows for power conversion at lower switching losses and thus higher energy efficiency. Also, higher switching frequencies may be used in order to increase the power density (reduced size) and reduce the cost of the electrical converter 200. FIGS. 8A-E show respectively the currents $i_{Lp}$, $i_{Ln}$, $i_x$, $i_y$, $i_z$ within a whole line cycle(360°) of the mains voltage in case of ZVS operation of output power stage 212. Also shown are the switching-cycle-averaged values $\langle i_{Lp} \rangle$, $\langle i_{Ln} \rangle$, $\langle i_x \rangle$, $\langle i_y \rangle$, $\langle i_z \rangle$ of these currents which correspond with the currents shown in FIG. 2E.

Figure 9:
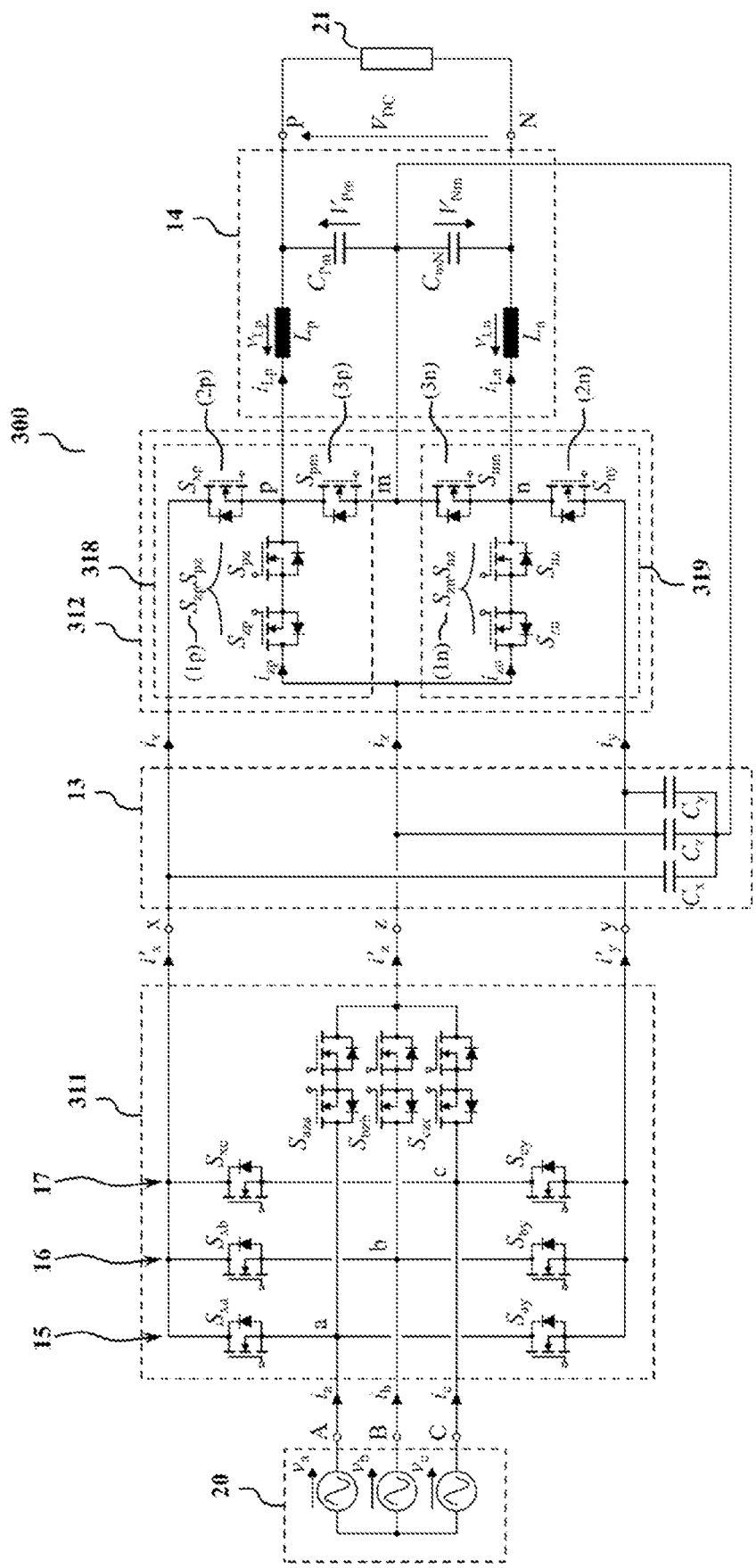
FIGS. 9, 10 and 11 show circuit diagrams of further exemplary embodiments of an electrical converter.

The electrical converters 10 (shown in FIGS. 1) and 200 (shown in FIG. 7) are unidirectional since the phase selector 11 and the output power stages 12, 212 contain diodes, only allowing power to be drawn from the electrical AC grid 20 and provide this power at the output to a load 21. FIG. 9, on the other hand, shows an electrical converter 300 that is bidirectional. Electrical converter 300 differs from converters 10, 200 in that the diodes $D_{ax}$, $D_{bx}$, $D_{cx}$, $D_{ya}$, $D_{yb}$, $D_{yc}$ of the phase selector 11 and the diodes $D_{zp}$, $D_{mp}$, $D_{nz}$, $D_{nm}$ of the output power stages 12, 212 have been replaced with controllable semiconductor switches $S_{xa}$, $S_{xb}$, $S_{xc}$, $S_{ay}$, $S_{by}$, $S_{cy}$ in the phase selector 311 and $S_{pz}$, $S_{pm}$, $S_{nz}$, $S_{mn}$ in the output power stage 312, respectively. It is noted that the electrical converter 300 may be used as a DC-to-AC converter with A, B, C being the output terminals and P, N the input terminals, as will be clear to a person skilled in the art. This may be useful e.g. in applications using solar cells.

Figure 10:
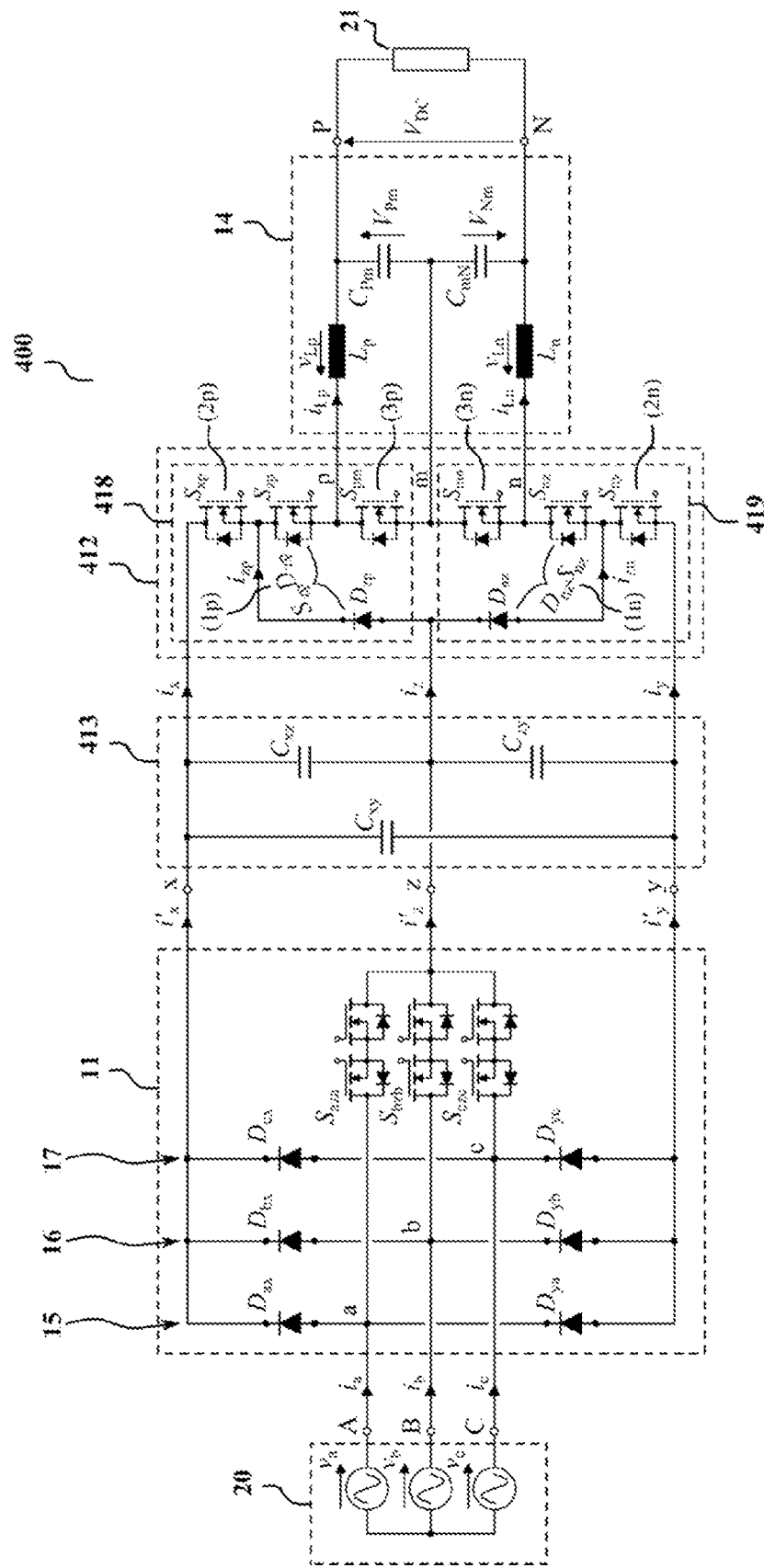

In FIG. 10 another electrical converter 400 is shown which differs from converter 10 in that the stacked buck bridge legs 18, 19 of the output power stage 412 are implemented using a different configuration of the first, second, third, fourth, fifth, and sixth semiconductor devices 1p, 2p, 3p, 1n, 2n, 3n, providing the same functionality. Also, in the electrical converter 400, the HF capacitors $C_{xy}$, $C_{xz}$, $C_{zy}$ which interconnect the intermediate voltage nodes x, y, z are connected in a delta configuration instead of a star configuration.

In either electrical converters 10, 200, and 400, diodes may be replaced by actively switchable semiconductor devices to allow for bidirectional power flow of the electrical converter (as in the embodiment of FIG. 9).

In either electrical converters 10, 200, 300, and 400, the HF capacitors $C_x$, $C_y$, $C_z$, $C_{xy}$, $C_{xz}$, $C_{zy}$ may be placed between the phase input terminals A, B, C and the phase selector 11, 311, and interconnect the phase input terminals A, B, C in the form of a star or delta configuration. A combination of a set of HF capacitors which interconnect the intermediate voltage nodes x, y, z (as in electrical converters 10, 200, 300, 400) and a set of HF capacitors which interconnect the phase input terminals A, B, C, either in the form of a star or delta configuration, or a combination, may also be used.

In either electrical converters 10, 200, and 300, the HF capacitors $C_x$, $C_y$, $C_z$ are connected in a star configuration. Alternatively, a delta configuration of these capacitors may be used in either of these electrical converters.

In electrical converter 400, the HF capacitors $C_{xy}$, $C_{xz}$, $C_{zy}$ are connected in a delta configuration. Alternatively, a star configuration of these capacitors may be used.

Figure 11:
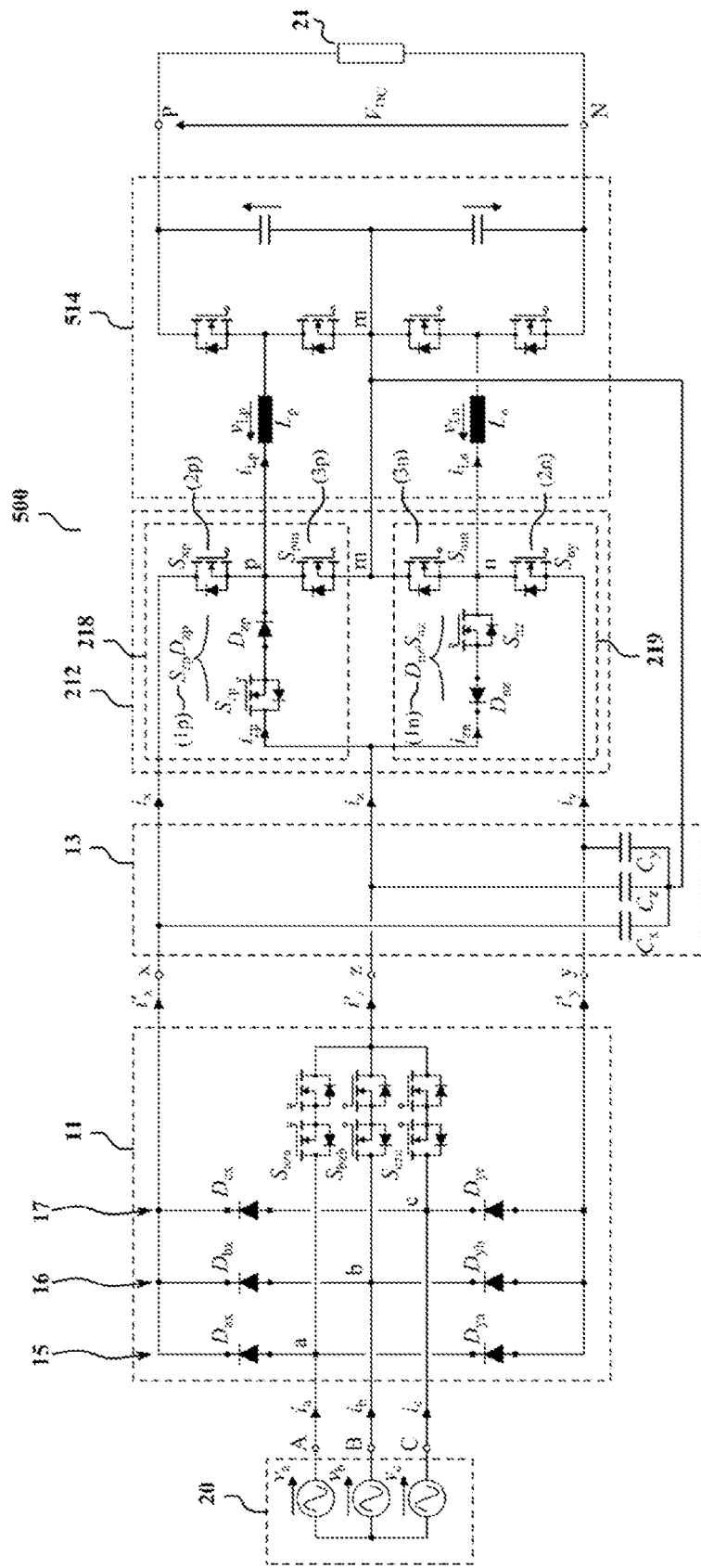

In FIG. 11 another electrical converter 500 is shown which differs from converter 200 in that the output filter 14 is replaced by an active output filter 514 that includes a boost stage. An active output filter may be used in the electrical converters of either FIG. 1, FIG. 7, FIG. 9, FIG. 10.

Figure 12A:
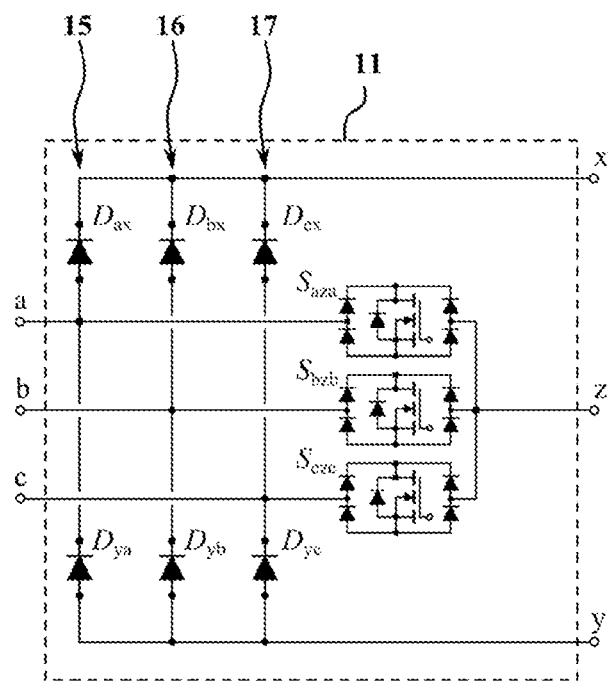
FIGS. 12A and 12B show circuit diagrams of variants of the phase selector of FIG. 1.
Figure 12B:
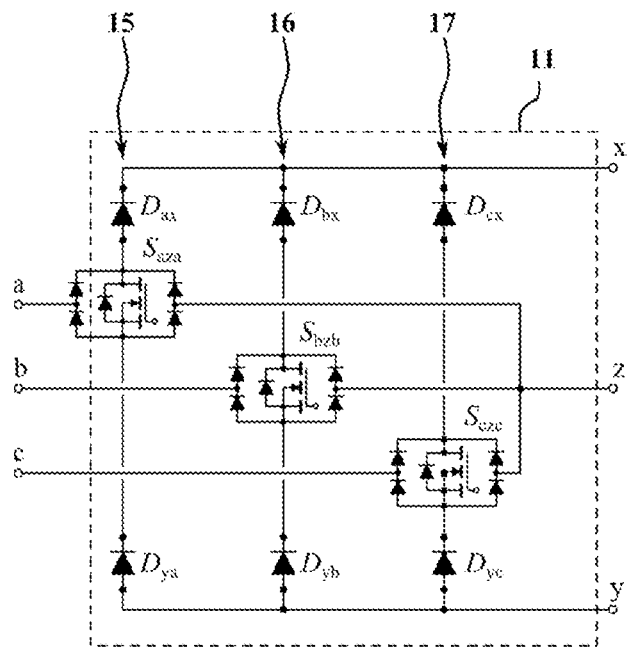

FIG. 12A, 12B show different variants of the three-phase phase selector 11, which may be used in the electrical converters of either FIG. 1, FIG. 7, FIG. 9, FIG. 10, FIG. 11. In the exemplary embodiment of FIG. 12A, each actively switchable semiconductor device $S_{aza}$, $S_{bzb}$, and $S_{czc}$ comprises four diodes and a transistor with an anti-parallel diode. In the exemplary embodiment of FIG. 12B, each actively switchable semiconductor device $S_{aza}$, $S_{bzb}$, and $S_{czc}$ comprises four diodes and a transistor with an anti-parallel diode, and the semiconductor device $S_{aza}$, $S_{bzb}$, and $S_{czc}$ are included in the legs 15, 16, 17, respectively. It is noted that when the transistor of the semiconductor device $S_{aza}$, $S_{bzb}$, and $S_{czc}$ is off (i.e. does not conduct) current in the legs 15, 16, 17 can still flow through the diodes of the semiconductor device $S_{aza}$, $S_{bzb}$, and $S_{czc}$.

As shown in FIG. 1, in order to accomplish the piece-wise sinusoidal shapes of intermediate currents $i'_x$, $i'_y$, $i'_z$, which results in three sinusoidal AC phase currents $i_a$, $i_b$, $i_c$, a central control unit 40 may be used which controls all the controllable semiconductor devices (switches) of the electrical converter 10, sending control signals to each switch via a communication interface 50. In particular, semiconductor devices $S_{aza}$, $S_{bzb}$, $S_{czc}$, $S_{xp}$, $S_{ny}$, $S_{zp}$, $S_{nz}$ are controlled by controller 40. Furthermore, the control unit has measurement input ports 42, 43, 44, 45, 46, for receiving measurements of:

42: the AC-grid phase voltages $v_a$, $v_b$, $v_c$;
43: the intermediate currents $i'_x$, $i'_y$, $i'_z$;
44: the inductor currents $i_{Lp}$, $i_{Ln}$;
45: the DC bus voltage $V_{DC}$;
46: the DC bus mid-point voltage $V_{mN}$, and an input port 41 to receive a set-value, which may be a requested DC output voltage $V^*_{DC}$.

Figure 13:
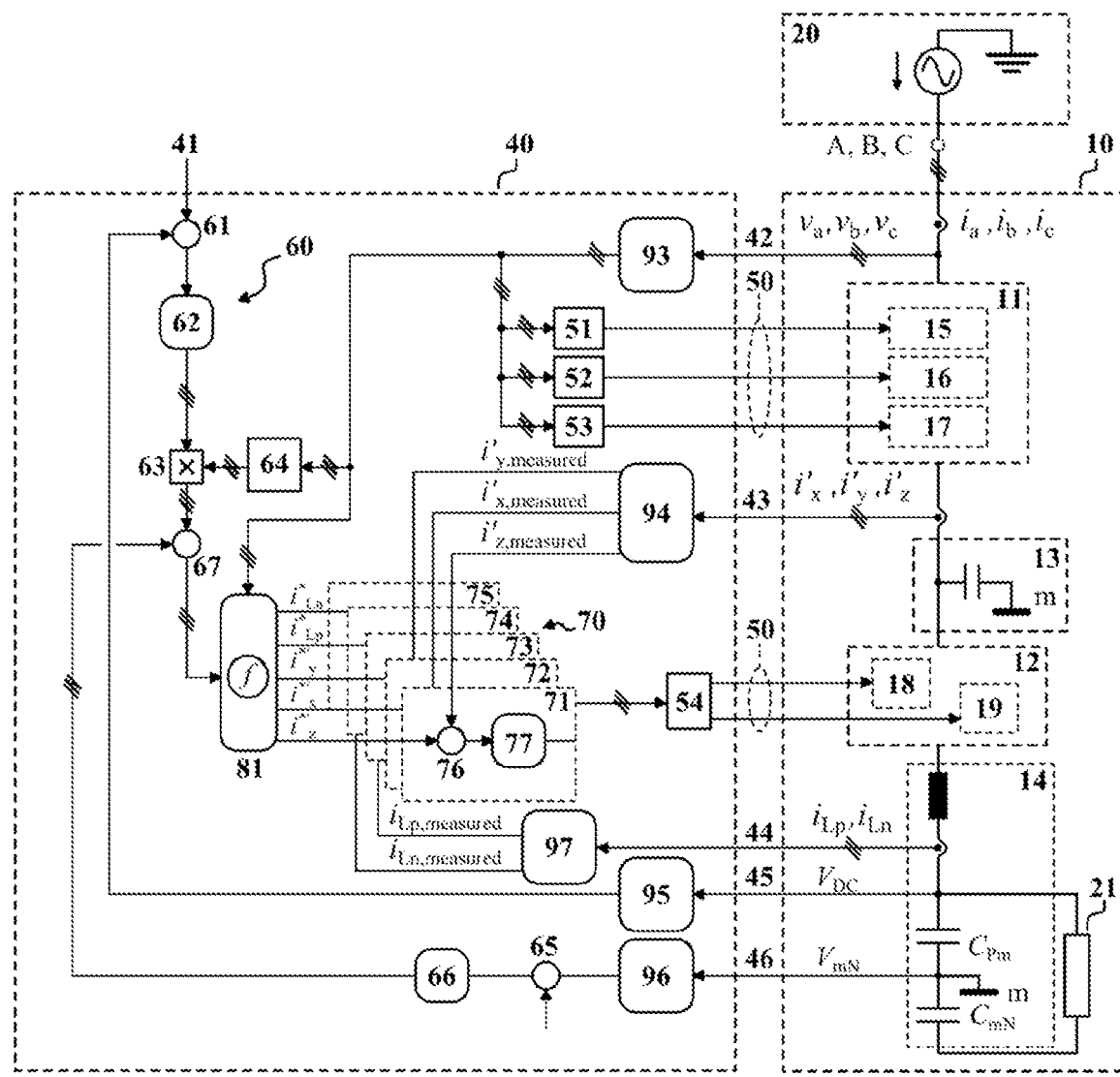
FIG. 13 illustrates schematically an exemplary embodiment of a control unit.

FIG. 13 shows a block diagram of an advantageous implementation of the central control unit 40 which is shown in a schematically way in FIG. 1. The electrical converter 10 is represented in FIG. 13 as a 'single-wire' equivalent circuit, wherein the annotations of the elements correspond with those given in FIG. 1. Three slashes in a signal line indicate the bundling of multiple signals, and may represent the transition to a vector representation.

The goal of the control unit 40 is to control the output voltage $V_{DC}$ to a requested set-value $V^*_{DC}$ that is received from an external unit via input port 41, and to balance the voltage across the two output capacitors $C_{Pm}$ and $C_{mN}$, for example by controlling the voltage across the lower output capacitor $C_{mN}$ to be substantially equal to half the DC bus voltage. Additionally, the current drawn from the phase inputs (a, b, c) needs to be shaped substantially sinusoidal and controlled substantially in phase with the corresponding phase voltage. As explained previously, this can also be achieved by controlling the intermediate currents $i'_x$, $i'_y$, $i'_z$, i.e., instead of directly controlling the phase currents $i_a$, $i_b$, $i_c$, to have piece-wise sinusoidal shapes.

The control of the output voltage $V_{DC}$ is advantageously done using a cascaded control structure, comprising an outer voltage control loop 60 and inner current control loop 70. The set-value of the output voltage is input to a comparator 61 via input port 41, and is compared with the measured output voltage obtained from a measurement means 95 (for example comprising a low-pass filter). The output of comparator 61 is the control-error signal of the output voltage, which is further input to a control element 62 (for example comprising a proportional-integral control block) that outputs instantaneous set-values related to the phase currents and/or set-values related to the DC component of the inductor currents. These set-values are input to multiplier 63, and multiplied with signals that are obtained from calculation element 64 that outputs normalized instantaneous values of the phase voltages. The inputs of calculation element 64 are the measured phase voltages $v_a$, $v_b$, $v_c$ obtained from a measurement means 93 (for example comprising a low-pass filter). The output of the multiplier 63 are set-values $i^*_a$, $i^*_b$, $i^*_c$, $i^*_{Lp}$, $i^*_{Ln}$ for the instantaneous, for example low-pass filtered, phase currents $i_a$, $i_b$, $i_c$, and the instantaneous, for example low-pass filtered, DC component of inductor currents $i_{Lb}$, $i_{Ln}$. Set-values $i^*_a$, $i^*_b$, $i^*_c$ are shaped substantially sinusoidal and positioned substantially in phase with the corresponding phase voltages. Set-values $i^*_{Lp}$, $i^*_{Ln}$ are substantially constant and, as explained above, may represent the DC output current to a load 21 as $i^*_{Lp} = \langle i_{Lp} \rangle = I_{DC}$ and $i^*_{Ln} = \langle i_{Ln} \rangle = I_{DC}$. The set-values $i^*_a$, $i^*_b$, $i^*_c$, $i^*_{Lp}$, $i^*_{Ln}$ are input to the current controller 70 after passing an addition element 67 and a selection element 81 whose functions are further detailed in the following text.

The current controller 70 is split into five individual current controllers 71, 72, 73, 74, 75, wherein:
Individual current controller 71 is used for controlling the middle intermediate current $i'_z$. This control is done by PWM modulation of the controllable switches of output power stage 12. As a result of the operation of the phase selector 11, therewith, controller 71 controls the current of the phase input A, B, C, that has a voltage between the highest voltage and the lowest voltage of the three-phase AC voltage;

Individual current controller 72 is used for controlling the upper intermediate current $i'_x$. This control is done by PWM modulation of the controllable switches of output power stage 12. Typically, only the duty cycles of the PWM control signals are varied in a controlled manner, but optionally also the switching frequency and/or the conduction sequence of the switches may be varied. For example, the conductions sequence may be selected from a list of possible conduction sequences based on a measurement of the operation of the converter. Also, for example, the switching frequency may be chosen to improve or optimize the operation of the converter, and more in particular to guarantee zero voltage switching. As a result of the operation of the phase selector 11, therewith, controller 72 controls the current of the phase input A, B, C, that has the highest voltage of the three-phase AC voltage;

Individual current controller 73 is used for controlling the lower intermediate current $i'_y$. This control is done by PWM modulation of the controllable switches of output power stage 12. As a result of the operation of the phase selector 11, therewith, controller 73 controls the current of the phase input A, B, C, that has the lowest voltage of the three-phase AC voltage.

Individual current controller 74 is used for controlling the current in the upper inductor $L_p$ of output filter 14, connected to upper buck bridge leg 18. This control is done by PWM modulation of the controllable switches of output power stage 12.

Individual current controller 75 is used for controlling the current in the lower inductor $L_n$ of output filter 14, connected to lower buck bridge leg 19. This control is done by PWM modulation of the controllable switches of output power stage 12.

Current controllers 74 and 75 jointly control the current supplied to a load 21.

Selector element 81 is used to send the set-values $i^*_a$, $i^*_b$, $i^*_c$, $i^*_{Lp}$, $i^*_{Ln}$ for the instantaneous phase currents and inductor currents to the correct individual current controller 71, 72, 73, 74, 75 depending on the voltage value of the phase inputs A, B, C, resulting in intermediate current set-values $i'^*_x$, $i'^*_y$, $i'^*_z$ and inductor current set-values $i^*_{Lp}$, $i^*_{Ln}$ for each individual current controller, wherein:

the set-value of the phase current of the phase input A, B, C, that has the highest voltage of the three-phase AC voltage is sent to individual current controller 72, resulting in set-value $i'^*_x$;

the set-value of the phase current of the phase input A, B, C, that has the lowest voltage of the three-phase AC voltage is sent to individual current controller 73, resulting in set-value $i'^*_y$;

the set-value of the phase current of the phase input A, B, C, that has a voltage between the highest voltage and the lowest voltage of the three-phase AC voltage is sent to individual current controller 71, resulting in set-value $i'^*_z$.

the set-value of the inductor current of upper inductor $L_p$ of the output filter 14 is sent to individual current controller 74, resulting in set-value $i^*_{Lp}$.

the set-value of the inductor current of lower inductor $L_n$ of the output filter 14 is sent to individual current controller 75, resulting in set-value $i^*_{Lp}$.

In each individual current controller the received set-value $i'^*_x$, $i'^*_y$, $i'^*_z$, $i^*_{Lp}$, $i^*_{Ln}$ for the instantaneous current is input to a comparator, for example comparator 76 of individual current controller 71, and compared with the measured current $i'_{x,measured}$, $i'_{y,measured}$, $i'_{z,measured}$, ghtRP$_{Lp,measured}$, $i_{Ln,measured}$ obtained from a measurement means 94 (for example comprising a low-pass filter) and from a measurement means 97. The output of the comparator is the control-error signal of the current, which is further input to a control element, for example control element 77 (for example a proportional-integral controller) of individual current controller 71. The output of current controller 70, which is for example a bundled combination of outputs of individual current controllers 71, 72, 73, 74, 75 is input to a PWM generation element, for example PWM generation element 54. The PWM generation element generates the PWM-modulated control signals for the controllable semiconductor switches of the PWM-controlled bridge legs, i.e. the upper buck bridge leg 18 of the upper buck circuit and the lower buck bridge leg 19 of the lower buck circuit. These PWM-modulated control signals are sent to the appropriate bridge legs via communication interface 50.

The selector switches of the phase selector 11 are either 'on' or 'off' during each 60° sector of the three-phase AC input voltage, depending on the voltage value of the phase inputs A, B, C, as explained above in connection with FIG. 2C. The control signals for the selector switches are generated by switch-signal generators 51, 52, 53 based on measured phase voltages obtained from a measurement means 93.

DC bus mid-point balancing is done by adding an offset value, by addition element 67, to the set-values $i^*_a$, $i^*_b$, $i^*_c$, $i^*_{Lp}$, $i^*_{Ln}$ for the instantaneous, for example low-pass filtered, phase currents $i_a$, $i_b$, $i_c$, and/or instantaneous, for example low-pass filtered, inductor currents $i_{Lp}$, $i_{Ln}$ which are output by multiplier 63. The offset value is obtained by comparing the measured DC bus midpoint voltage obtained from a measurement means 96 (for example comprising a low-pass filter) with a set-value (for example $V_{DC}/2$) using comparator 65 and feeding the error signal (output of comparator 65) into a control element 66.

The phase currents $i_a$, $i_b$, $i_c$ shown in FIG. 2F are obtained by controlling the electrical converter 10 using such control unit 40 and control method detailed in the foregoing text. As explained above, the phase currents $i_a$, $i_b$, $i_c$ are indirectly controlled, i.e., they are the result of the controlling of the intermediate currents $i'_x$, $i'_y$, $i'_z$ (shown in FIG. 2E) and/or the inductor currents $i_{Lp}$, $i_{La}$ and of the operation of the phase selector 11. The set-points for the intermediate currents $i'^*_x$, $i'^*_y$, $i'^*_z$ are derived from set-values $i^*_a$, $i^*_b$, $i^*_c$ by selector element 81 based on the measured phase voltages.

Figure 14:
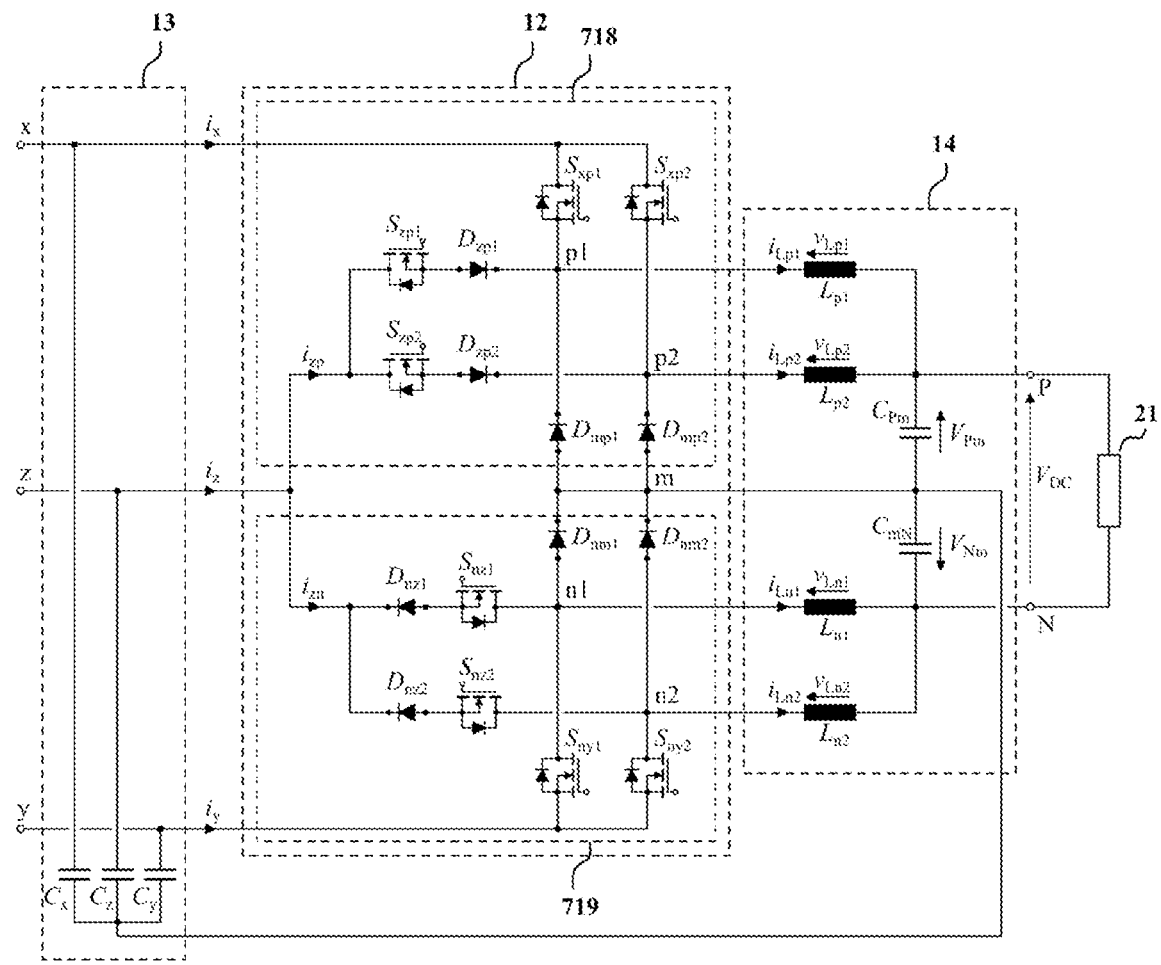
FIG. 14 is a circuit diagram of yet another exemplary embodiment of an output stage of an electrical converter with two upper buck circuits connected in parallel and two lower buck circuits connected is parallel.

In FIG. 14 another output stage 12 is shown in which the stacked series connected buck bridge legs 18, 19 of FIG. 1 are replaced by a first parallel connection of upper bridge legs 718 and a second parallel connection of lower bridge legs 719, wherein the first parallel connection of upper bridge legs 718 is connected in series with the second parallel connection of lower bridge legs 719. The first parallel connection of buck bridge legs 718 comprises two first semiconductor devices, two second semiconductor devices and two third semiconductor devices. The parallel connection of second buck bridge legs 719 comprises two fourth semiconductor devices, two fifth semiconductor devices and two sixth semiconductor devices. Each second and fifth semiconductor device is a buck switch ($S_{xp1}$ and $S_{xp2}$ for the upper buck bridge legs 718 and $S_{ny1}$ and $S_{ny2}$ for the lower buck bridge legs 719). Each third and sixth semiconductor device is a buck diode ($D_{mp1}$ and $D_{mp2}$ for the upper buck bridge legs 718 and $D_{nm1}$ and $D_{nm2}$ for the lower buck bridge legs 719). The second and third semiconductor devices of the upper buck legs 718 and the fifth and sixth semiconductor devices of the lower buck legs 719 are connected in a half-bridge configuration. The switched middle nodes of the upper buck bridge legs 718 form upper switch-node terminals p1, p2 which are connected to output P via respective first buck inductors, here upper buck inductors $L_{p1}$, $L_{p2}$ and the switched middle nodes of the lower buck bridge legs 719 form lower switch-node terminals n1, n2 which are connected to output N via respective second buck inductors, here lower buck inductors $L_{n1}$, $L_{n2}$. As in the embodiment of FIG. 1, the common node m of the stacked buck bridge legs 718, 719 is connected to the midpoint of the output filter 14 which comprises two output filter capacitors $C_{Pm}$, $C_{mN}$ that are connected in series between the upper output terminal P and the lower output terminal N. Each first and fourth semiconductor device of the buck bridge legs 718, 719 is an interconnection switch $S_{zp1}D_{zp1}$, $D_{nz1}S_{nz1}$, $S_{zp2}D_{zp2}$ and $D_{nz2}S_{nz2}$ with bi-directional voltage blocking capability, that allows for connecting the switched middle node of the respective bridge, i.e., the upper switch-node terminal p1, p2 for the upper buck bridge legs 718 and the lower switch-node terminals n1, n2 for the lower buck bridge legs 719, with the middle intermediate voltage node z. FIG. 14 illustrates that the output stage may be scaled by providing multiple first upper buck circuits in parallel and by providing multiple second lower buck circuits in parallel. This may be useful, e.g. when more power is needed. When multiple first and second buck circuits are connected in parallel as in FIG. 14, such respective first and second buck circuits may be controlled in an interleaved way.

The functions of the functional block labelled as "controller", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Aspects of the present disclosure as described herein are set out in the following numbered clauses.

1. An electrical converter (10) for conversion between a three-phase AC signal and a DC signal, comprising:
   three phase terminals (A, B, C),
   a first DC terminal (P) and a second DC terminal (N),
   a phase selector (11) for connecting the three phase terminals to a first intermediate node (x),
   a second intermediate node (y) and a third intermediate node (z) of the electrical converter,
   a first buck circuit comprising a first switch-node terminal (p) that is operably connected to the first DC terminal (P) and a second buck circuit comprising a second switch-node terminal (n) that is operably connected to the second DC terminal (N), wherein the first and the second buck circuits are connected for converting a voltage at the first intermediate node (x), the second intermediate node (y) and the third intermediate node (z) to a voltage between the first and second DC terminal (P, N),
   wherein the first and the second buck circuits are connected in series between the first intermediate node (x) and the second intermediate node (y) such that there is a common node (m) of the first and second buck circuit; wherein the first and second buck circuit comprise at least one actively switchable device connected between the common node and the third intermediate node.

2. Electrical converter of clause 1, wherein the first buck circuit comprises:
   a first device (1p) connected for interrupting a current flow between the first switch-node terminal (p) and the third intermediate node (z),
   a second device (2p) connected for interrupting a current flow between the first switch-node terminal (p) and the first intermediate node (x);
   a third device (3p) connected for interrupting a current flow between the first switch-node terminal (p) and the common node;
   wherein at least two of said first, second and third devices of the first buck circuit are actively switchable; and
   wherein the second buck circuit comprises:
   a fourth device (1n) connected for interrupting a current flow between the second switch-node terminal (n) and the third intermediate node (z), a fifth device (2n) connected for interrupting a current flow between the second switch-node terminal (n) and the second intermediate node (y), and a sixth device (3n) connected for interrupting a current flow between the second switch-node terminal (n) and the common node (m); wherein at least two of said fourth, fifth and sixth devices of the second buck circuit are actively switchable.

3. Electrical converter of the preceding clause, wherein the first device and the fourth device are actively switchable, and the at least one actively switchable device comprises the first device and the fourth device.

4. Electrical converter of clause 2 or 3, wherein at least one of the second device and the third device and at least one of the fifth device and the sixth device are actively switchable.

5. Electrical converter of any one of the preceding clauses, wherein the first buck circuit is configured for allowing connecting the first switch-node terminal (p) to any one of the first intermediate node (x), the third intermediate node (z), and the common node (m); and wherein the second buck circuit is configured for allowing connecting the second switch-node terminal (n) to any one of the second intermediate node (y), the third intermediate node (z), and the common node (m).

6. Electrical converter of any one of the preceding clauses, wherein the phase selector comprises devices ($S_{aza}$, $S_{bzb}$, $S_{czc}$) that are actively switchable for selectively connecting the third intermediate node to the three phase terminals.

7. Electrical converter of any one of the preceding clauses, further comprising a controller (40) configured to control at least one of the phase selector and the first and second buck circuit.

8. Electrical converter of the preceding clause, wherein the phase selector (11) and the controller (40) are configured such that switching of the devices of the phase selector is controlled according to a switching pattern in which:
   the phase terminal having a highest voltage is connected to the first intermediate node,
   the phase terminal having a lowest voltage is connected to the second intermediate node, and
   the phase terminal having an intermediate voltage between the highest voltage and the lowest voltage is connected to the third intermediate node.

9. Electrical converter of clause 7 or 8, wherein the controller is configured to control at least one of a duty cycle, a switching frequency and a conduction sequence of control signals used to control the first buck circuit and the second buck circuit.

10. Electrical converter of any one of the preceding clauses, wherein the first and second buck circuit further comprise a first filter inductor (Lp) connected between the first switch-node terminal (p) and the first DC terminal (P) and a second filter inductor (Ln) connected between the second switch-node terminal (n) and the second DC terminal (N), respectively.

11. Electrical converter of any one of the preceding clauses, further comprising at least one filter capacitor, preferably a series connection of at least two filter capacitors (CPm, CmN), connected between the first and second DC terminals (P, N).

12. Electrical converter of the preceding clause, wherein the common node (m) is connected to a midpoint of the series connection of the at least two filter capacitors.

13. Electrical converter of any one of the preceding clauses, comprising a filter (13) comprising capacitors (Cx, Cy, Cz; Cxy, Cxz, Czy) which interconnect the intermediate nodes (x, y, z), preferably in the form of a star or delta connection.

14. Electrical converter of the preceding clause, wherein the capacitors (Cx, Cy, Cz) are interconnected in a star connection and wherein the common node (m) is connected to a star point of the star connection.

15. Electrical converter of clause 7, optionally in combination with any one of the preceding clauses, comprising measurement means (93, 94, 95, 96, 97) configured for measuring at least one of the DC signal, an electrical signal influencing the DC signal, an electrical signal influenced by the DC signal, and wherein the controller (40) comprises a control loop (71-75) configured to adapt at least one of a duty cycle, a switching frequency, and a conduction sequence of control signals for controlling at least one of the first and second buck circuit based on measurements of the measurement means.

16. Electrical converter of the preceding clause, wherein the measurement means comprises at least one of the following: a current measurement means (97) for measuring at least one of a current between the first switch-node terminal (p) and the first DC terminal (P) and a current between the second switch-node terminal (n) and the second DC terminal (N), a voltage measurement means (93) for measuring voltages at the three phase terminals, a voltage measurement means (95) for measuring a voltage between the second and first DC terminal, a current measurement means (94) for measuring a current between the phase selector and one of the first, the third and the second intermediate node, a voltage measurement means (96) for measuring a voltage of the common node.

17. Electrical converter of any one of the preceding clauses, wherein the phase selector comprises three selector legs (16, 17, 18) for connecting one of the three phase terminals to the first intermediate node (x), the second intermediate node (y) and the third intermediate node (z), wherein each of the three selector legs comprises a half bridge comprising switches ($D_{ax}$, $D_{bx}$, $D_{cx}$, $D_{ya}$, $D_{yb}$, $D_{yc}$, $S_{xa}$, $S_{xb}$, $S_{xc}$, $S_{ay}$, $S_{by}$, $S_{cy}$)

18. A battery charging system, in particular for charging a battery of an electric vehicle, comprising a power supply unit, the power supply unit comprising the electrical converter of any one of the preceding clauses.

19. An electric motor drive system, comprising a power supply unit, the power supply unit comprising the electrical converter of any one of the clauses 1 to 17.

20. A gradient amplifier comprising the electrical converter of any one of the clauses 1 to 17.

21. A method of converting between a three phase AC signal and a DC signal, comprising:
   converting between the three phase AC signal and an intermediate signal, wherein the intermediate signal is applied between a first intermediate node (x), a second intermediate node (y) and a third intermediate node (z), wherein a voltage of the three phase AC signal is applied selectively to the first intermediate node (x), the second intermediate node (y) and the third intermediate node (z),
   converting between the intermediate signals and the DC signal using a first and a second buck circuit, wherein the first and the second buck circuits are connected in series between the first intermediate node (x) and the second intermediate node (y) such that there is a common node (m) of the first and second buck circuit, wherein said converting comprises connecting the third intermediate node (z) to a first switch-node terminal (p) of the first buck circuit during a first time interval (T1) and to a second switch-node terminal (n) of the second buck circuit during a second time interval (T2), using at least one actively switchable device between the common node and the third intermediate node.

22. Method of the preceding clause, wherein a voltage of the three phase AC signal having a highest voltage is applied to the first intermediate node (x), a voltage of the three phase AC signal having a lowest voltage is applied to the second intermediate node (y), and a voltage of the three phase AC signal having an intermediate voltage between the highest voltage and the lowest voltage is applied to the third intermediate node (z).

23. Method of the preceding clause, wherein the converting between the intermediate signal and the DC signal using a first and a second buck circuit comprises:
actively controlling a first switchable device (1p) connected between the third intermediate node (z) and the first switch-node terminal (p) and a fourth switchable device (1n) between the third intermediate node (z) and the second switch-node terminal (n);
actively controlling at least one of a second switchable device (2p) connected between the first intermediate node (x) and the first switch-node terminal (p) and a third switchable device (3p) connected between the common node (m) and the first switch-node terminal (p); actively controlling at least one of a fifth switchable device (2n) between the second intermediate node (y) and the second switch-node terminal (n) and a sixth switchable device (3n) between the common node (m) and the second switch-node terminal (n).

24. Method of any one of the clauses 21-23, wherein the converting between the intermediate signal and the DC signal using a first and a second buck circuit comprises controlling at least one of a duty cycle, a switching frequency, a conduction sequence of control signals to control the first and second buck circuit.

25. Method of any one of the clauses 21-24, wherein the converting between the intermediate signals and the DC signal using a first and a second buck circuit comprises connecting the first switch-node terminal (p) to any one of the first intermediate node (x), the third intermediate node (z), and the common node (m); and connecting the second switch-node terminal (n) to any one of the second intermediate node (y), the third intermediate node (z), and the common node (m).

Whilst the principles of the present disclosure have been set out above in connection with specific embodiments, it is to be understood that this description is merely made by way of example and not as a limitation of the scope of protection which is determined by the appended claims.

The invention claimed is:

1. An electrical converter for conversion between a three-phase AC signal and a DC signal, the electrical converter comprising:
three phase terminals (A, B, C);
a first DC terminal (P) and a second DC terminal (N);
a phase selector configured to connect the three phase terminals to a first intermediate node (x), a second intermediate node (y) and a third intermediate node (z) of the electrical converter;
a first buck circuit comprising a first switch-node terminal (p) operably connected to the first DC terminal (P) and a second buck circuit comprising a second switch-node terminal (n) operably connected to the second DC terminal (N), wherein the first and the second buck circuits are connected and configured to convert a voltage at the first intermediate node (x), the second intermediate node (y), and the third intermediate node (z) to a voltage between the first and second DC terminals (P, N);
wherein the first and the second buck circuits are connected in series between the first intermediate node (x) and the second intermediate node (y) such that there is a common node (m) of the first and second buck circuits;
wherein the first and second buck circuits comprise at least one actively switchable device connected between the common node and the third intermediate node;
wherein the first buck circuit is configured to allow connecting the first switch-node terminal (p) to any one of the first intermediate node (x), the third intermediate node (z), and the common node (m); and
wherein the second buck circuit is configured to allow connecting the second switch-node terminal (n) to any one of the second intermediate node (y), the third intermediate node (z), and the common node (m).

2. The electrical converter of claim 1, wherein the first buck circuit comprises:
a first device 1p connected and configured to interrupt a current flow between the first switch-node terminal (p) and the third intermediate node (z), a second device (2p) connected and configured to interrupt a current flow between the first switch-node terminal (p) and the first intermediate node (x);
a third device (3p) connected and configured to interrupt a current flow between the first switch-node terminal (p) and the common node;
wherein at least two of said first, second, and third devices of the first buck circuit are actively switchable; and
wherein the second buck circuit comprises:
a fourth device (1n) connected and configured to interrupt a current flow between the second switch-node terminal (n) and the third intermediate node (z),
a fifth device (2n) connected and configured to interrupt a current flow between the second switch-node terminal (n) and the second intermediate node (y), and
a sixth device (3n) connected and configured to interrupt a current flow between the second switch-node terminal (n) and the common node (m);
wherein at least two of said fourth, fifth, and sixth devices of the second buck circuit are actively switchable.

3. The electrical converter of claim 2, wherein the first device and the fourth device are actively switchable, and wherein the at least one actively switchable device comprises the first device and the fourth device.

4. The electrical converter of claim 2, wherein at least one of the second device and the third device and at least one of the fifth device and the sixth device are actively switchable.

5. The electrical converter of claim 1, wherein the phase selector comprises devices ($S_{aza}$, $S_{bzb}$, $S_{czc}$) that are actively switchable to selectively connect the third intermediate node to the three phase terminals.

6. The electrical converter of claim 1, further comprising a controller configured to control at least one of the phase selector and the first and second buck circuit, wherein the phase selector and the controller are configured such that switching of the devices of the phase selector is controlled according to a switching pattern in which:
the phase terminal having a highest voltage is connected to the first intermediate node,
the phase terminal having a lowest voltage is connected to the second intermediate node, and
the phase terminal having an intermediate voltage between the highest voltage and the lowest voltage is connected to the third intermediate node.

7. The electrical converter of claim 6, wherein the controller is configured to control at least one of a duty cycle, a switching frequency, and a conduction sequence of control signals used to control the first buck circuit and the second buck circuit.

8. The electrical converter of claim 6, further comprising measurement device configured to measure at least one of the DC signal, an electrical signal influencing the DC signal, and an electrical signal influenced by the DC signal; and
wherein the controller comprises a control loop configured to adapt at least one of a duty cycle, a switching frequency, and a conduction sequence of control signals for configured to control at least one of the first and second buck circuit based on measurements of the measurement device.

9. The electrical converter of claim 8, wherein the measurement device comprises at least one of the following:
a current measurement device configured to measure at least one of a current between the first switch-node terminal (p) and the first DC terminal (P) and a current between the second switch-node terminal (n) and the second DC terminal (N),
a voltage measurement device configured to measure voltages at the three phase terminals,
a voltage measurement device configured to measure a voltage between the second and first DC terminal,
a current measurement device configured to measure a current between the phase selector and one of the first, the third, and the second intermediate node, and
a voltage measurement device configured to measure a voltage of the common node.

10. The electrical converter of claim 1, wherein the first and second buck circuit further comprise a first filter inductor (Lp) connected between the first switch-node terminal (p) and the first DC terminal (P) and a second filter inductor (Ln) connected between the second switch-node terminal (n) and the second DC terminal (N), respectively.

11. The electrical converter of claim 1, further comprising a series connection of at least two filter capacitors, connected between the first and second DC terminals (P, N), wherein the common node (m) is connected to a midpoint of the series connection of the at least two filter capacitors.

12. The electrical converter of claim 1, comprising a filter comprising capacitors interconnecting the intermediate nodes (x, y, z) in the form of a star connection, and wherein the common node (m) is connected to a star point of the star connection.

13. The electrical converter of claim 1, wherein the phase selector comprises three selector legs configured to connect one of the three phase terminals to the first intermediate node (x), the second intermediate node (y), and the third intermediate node (z), wherein each of the three selector legs comprises a half bridge comprising switches.

14. A battery charging system, comprising a power supply unit, the power supply unit comprising the electrical converter of claim 1.

15. An electric motor drive system, comprising a power supply unit, the power supply unit comprising the electrical converter of claim 1.

16. A gradient amplifier comprising the electrical converter of claim 1.

17. The electrical converter of claim 1, comprising a filter (13) comprising capacitors interconnecting the intermediate nodes (x, y, z) in the form of a delta connection.

18. A method of converting between a three phase AC signal and a DC signal, the method comprising:
converting between the three phase AC signal and an intermediate signal, wherein the intermediate signal is applied between a first intermediate node (x), a second intermediate node (y), and a third intermediate node (z), wherein a voltage of the three phase AC signal is applied selectively to the first intermediate node (x), the second intermediate node (y), and the third intermediate node (z);
converting between the intermediate signals and the DC signal utilizing a first and a second buck circuit, wherein the first and the second buck circuits are connected in series between the first intermediate node (x) and the second intermediate node (y) such that there is a common node (m) of the first and second buck circuit, wherein said converting comprises connecting the third intermediate node (z) to a first switch-node terminal (p) of the first buck circuit during a first time interval (T1) and to a second switch-node terminal (n) of the second buck circuit during a second time interval (T2), utilizing at least one actively switchable device between the common node and the third intermediate node;
wherein the converting between the intermediate signals and the DC signal utilizing a first and a second buck circuit comprises connecting the first switch-node terminal (p) to any one of the first intermediate node (x), the third intermediate node (z), and the common node (m), and connecting the second switch-node terminal (n) to any one of the second intermediate node (y), the third intermediate node (z), and the common node (m).

19. The method of claim 18, wherein a voltage of the three phase AC signal having a highest voltage is applied to the first intermediate node (x), a voltage of the three phase AC signal having a lowest voltage is applied to the second intermediate node (y), and a voltage of the three phase AC signal having an intermediate voltage between the highest voltage and the lowest voltage is applied to the third intermediate node (z).

20. The method of claim 19, wherein the converting between the intermediate signal and the DC signal utilizing a first and a second buck circuit comprises:
actively controlling a first switchable device (1p) connected between the third intermediate node (z) and the first switch-node terminal (p) and a fourth switchable device (1n) between the third intermediate node (z) and the second switch-node terminal (n);
actively controlling at least one of a second switchable device (2p) connected between the first intermediate node (x) and the first switch-node terminal (p) and a third switchable device (3p) connected between the common node (m) and the first switch-node terminal (p);
actively controlling at least one of a fifth switchable device (2n) between the second intermediate node (y) and the second switch-node terminal (n) and a sixth switchable device (3n) between the common node (m) and the second switch-node terminal (n).

* * * * *

UNITED STATES PATENT AND TRADEMARK OFFICE
CERTIFICATE OF CORRECTION

PATENT NO. : 11,881,792 B2
APPLICATION NO. : 17/603238
DATED : January 23, 2024
INVENTOR(S) : Jordi Everts and Thomas Valentijn Gerrits It is certified that error appears in the above-identified patent and that said Letters Patent is hereby corrected as shown below:

In the Claims

Column 26, Line 21, Claim 2: the text "a first device 1p) connected" should read --a first device (1p) connected--.

Column 27, Line 12, Claim 8: the text "control signals for configured" should read --control signals configured--.

Signed and Sealed this
Fifth Day of March, 2024

Katherine Kelly Vidal
*Director of the United States Patent and Trademark Office*